US012293691B2

(12) United States Patent
Matsueda et al.

(10) Patent No.: US 12,293,691 B2
(45) Date of Patent: May 6, 2025

(54) DISPLAY DEVICE AND COMPUTER READABLE MEDIA

(71) Applicant: NLT Technologies, Ltd., Kanagawa (JP)

(72) Inventors: Yojiro Matsueda, Kanagawa (JP); Kenichi Takatori, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/301,517

(22) Filed: Apr. 6, 2021

(65) Prior Publication Data

US 2021/0225247 A1 Jul. 22, 2021

Related U.S. Application Data

(63) Continuation of application No. 15/255,377, filed on Sep. 2, 2016, now abandoned.

(30) Foreign Application Priority Data

Sep. 2, 2015 (JP) ................................ 2015-173215
May 25, 2016 (JP) ................................ 2016-104437

(51) Int. Cl.
*G09G 3/20* (2006.01)
*G09G 3/3233* (2016.01)
*G09G 3/3266* (2016.01)

(52) U.S. Cl.
CPC ......... *G09G 3/2003* (2013.01); *G09G 3/3233* (2013.01); *G09G 3/3266* (2013.01);
(Continued)

(58) Field of Classification Search
None
See application file for complete search history.

(56) References Cited

U.S. PATENT DOCUMENTS 9,245,932 B2 * 1/2016 Yoon .................. H01L 27/3216
9,767,741 B2 9/2017 Bai et al.
(Continued)

FOREIGN PATENT DOCUMENTS

CN 101373575 A 2/2009
JP H09-179529 A 7/1997
(Continued)

OTHER PUBLICATIONS

U.S. Appl. No. 15/255,377, filed Sep. 2, 2016.
(Continued)

*Primary Examiner* — Benjamin X Casarez
(74) *Attorney, Agent, or Firm* — NIXON & VANDERHYE

(57) ABSTRACT

A display device includes pixels having different arrangements of subpixels and reducing a color edge. The display device includes a display unit where a plurality of first pixels including subpixels of three colors and second pixels including subpixels of the three colors are alternately arrayed in row and column directions, an arrangement of the subpixels in the first pixel and an arrangement of the subpixels in the second pixel differing from each other, and a luminance allocation unit allocating luminance of a subpixel of a first color among the three colors in the first pixel to a subpixel of the first color in the second pixel adjacent to the first pixel with a predetermined ratio and allocating luminance of the subpixel of the first color in the second pixel to the subpixel of the first color in the first pixel adjacent to the second pixel with a predetermined ratio.

8 Claims, 34 Drawing Sheets

(52) U.S. Cl.
CPC ............... *G09G 2300/0452* (2013.01); *G09G 2300/0842* (2013.01); *G09G 2300/0861* (2013.01); *G09G 2310/0262* (2013.01); *G09G 2310/0283* (2013.01)

(56) References Cited

U.S. PATENT DOCUMENTS

| | | | | |
|---|---|---|---|---|
| 2002/0070909 | A1* | 6/2002 | Asano | H10K 59/35 345/76 |
| 2004/0217694 | A1* | 11/2004 | Cok | G09G 3/3216 313/504 |
| 2006/0103615 | A1 | 5/2006 | Shih et al. | |
| 2006/0158466 | A1 | 7/2006 | Chien et al. | |
| 2006/0170712 | A1* | 8/2006 | Miller | H10K 59/352 345/695 |
| 2009/0051627 | A1 | 2/2009 | Ihata et al. | |
| 2009/0121983 | A1* | 5/2009 | Sung | H10K 59/352 345/76 |
| 2009/0322215 | A1 | 12/2009 | Sung et al. | |
| 2010/0270912 | A1 | 10/2010 | Ko | |
| 2011/0260951 | A1 | 10/2011 | Hwang et al. | |
| 2011/0260952 | A1 | 10/2011 | Hwang et al. | |
| 2011/0291550 | A1 | 12/2011 | Kim et al. | |
| 2012/0056531 | A1* | 3/2012 | Park | G09G 3/3233 313/506 |
| 2012/0092238 | A1 | 4/2012 | Hwang et al. | |
| 2013/0222217 | A1* | 8/2013 | Shin | H10K 59/352 345/80 |
| 2013/0286262 | A1 | 10/2013 | Hayashi et al. | |
| 2014/0197396 | A1* | 7/2014 | Madigan | H10K 71/135 438/34 |
| 2014/0292622 | A1* | 10/2014 | Lee | H01L 27/3216 345/80 |
| 2015/0035729 | A1 | 2/2015 | Huang | |
| 2015/0061978 | A1 | 3/2015 | Shih et al. | |
| 2015/0129856 | A1* | 5/2015 | Kim | H01L 27/3248 257/40 |
| 2015/0235617 | A1 | 8/2015 | Guo et al. | |
| 2016/0019825 | A1 | 1/2016 | Guo et al. | |
| 2016/0027404 | A1 | 1/2016 | Nakanishi et al. | |
| 2016/0104413 | A1 | 4/2016 | Matsueda et al. | |
| 2016/0126287 | A1 | 5/2016 | Her et al. | |
| 2016/0155416 | A1 | 6/2016 | Lee | |
| 2016/0225833 | A1* | 8/2016 | Kim | H01L 27/3218 |
| 2016/0225834 | A1* | 8/2016 | Kim | H01L 27/3218 |
| 2016/0379540 | A1 | 12/2016 | Guo et al. | |
| 2017/0092174 | A1 | 3/2017 | Cote et al. | |
| 2017/0132969 | A1 | 5/2017 | Guo et al. | |

FOREIGN PATENT DOCUMENTS

| | | |
|---|---|---|
| JP | 2002-044570 A | 2/2002 |
| JP | 2011-249334 | 12/2011 |

OTHER PUBLICATIONS

Non-Final Office Action issued in co-pending U.S. Appl. No. 15/255,377 dated Jun. 28, 2018.
Final Office Action issued in co-pending U.S. Appl. No. 15/255,377 dated Jan. 24, 2019.
Non-Final Office Action issued in co-pending U.S. Appl. No. 15/255,377 dated May 1, 2019.
Final Office Action issued in co-pending U.S. Appl. No. 15/255,377 dated Nov. 8, 2019.
Non-Final Office Action issued in co-pending U.S. Appl. No. 15/255,377 dated Mar. 19, 2020.
Final Office Action issued in co-pending U.S. Appl. No. 15/255,377 dated Sep. 21, 2020.
Non-Final Office Action issued in co-pending U.S. Appl. No. 15/255,377 dated Jan. 6, 2021.
Office Action issued in Japanese Patent Application No. 2016-104437 dated Mar. 31, 2020 with English abstract provided.
Office Action issued in Chinese Patent Application No. 201610772958.1 dated Dec. 17, 2019 with English translation provided.
Office Action issued in Japanese Patent Application No. 2016-104437 dated Nov. 10, 2020.

* cited by examiner $\alpha = 0.6$
$\beta = 0.4$

| | | | |
|---|---|---|---|
| 0% | 0% | 0% | 0% |
| 0% | 80% | 100% | 0% |
| 0% | 90% | 100% | 0% |
| 0% | 0% | 0% | 0% |

| | | | |
|---|---|---|---|
| 0% | 0% | 0% | 0% |
| 48% | 72% | 60% | 0% |
| 36% | 114% | 40% | 0% |
| 0% | 0% | 0% | 0% |

| | | | |
|---|---|---|---|
| 0% | 0% | 0% | 0% |
| 48% | 72% | 60% | 0% |
| 36% | 100% | 54% | 0% |
| 0% | 0% | 0% | 0% |

DISPLAY DEVICE AND COMPUTER READABLE MEDIA

CROSS-REFERENCE TO RELATED APPLICATIONS

This is a continuation of U.S. application Ser. No. 15/255,377 filed on Sep. 2, 2016 claims priority under 35 U.S.C. § 119(a) on Patent Application No. 2015-173215 filed in Japan on Sep. 2, 2015 and Patent Application No. 2016-104437 filed in Japan on May 25, 2016, the entire contents of which are hereby incorporated by reference.

FIELD

The present invention relates to a display device and a program.

BACKGROUND

Display devices displaying a color image by using pixels configured by combining subpixels of three colors that are red, green, and blue have been used. Particularly, in order to secure an opening ratio (aperture ratio) at a high resolution in an OLED display device, a pixel array where columns including alternately-arranged subpixels of red and green and columns including subpixels of blue are alternately arranged has been proposed. In the description hereinafter, an organic light emitting diode is referred to an OLED.

First, the reason why the pixel array of Japanese Patent Application Laid-Open No 2011-249334 (hereinafter, referred to as Patent Document 1) is proposed will be described. In an OLED display device, a color image is displayed by combining subpixels of, for example, three colors that are red, green, and blue. Herein, each subpixel emits light of any one of red, green, and blue. Black material is placed around each subpixel. The black material prevents color mixing and light leakage between the adjacent subpixels. On the other hand, the existence of the black material which does not emit light decreases the opening ratio.

In the manufacturing process of the OLED display device, a frame having a predetermined shape is formed on a plate shape base member by a black material, and after that, a layer of a light-emitting material is formed by using a metal mask. The metal mask is a mask which arranged a plurality of openings to a thin metal plate. The size of the opening is slightly larger than the inner edge of the frame of the black material where a predetermined light-emitting material is arranged. The layer of the light-emitting material is formed in a shape corresponding to each opening of the metal mask by deposition. Therefore, the layer of the light-emitting material is formed inside of the frame of the black material without a gap.

However, a sufficient distance is needed between the openings of the metal mask. If the openings are too close to each other, it is difficult to manufacture the metal mask, and during the use, the portion may be broken to form a hole, so that there is a possibility that the metal mask cannot fulfill the function. In order to solve the problem, when subpixels of the same color are arranged in a line, a slit-shaped metal mask which use a gap between a pluralities of wires fixed to a framework as a strip-shaped opening may be used. By using the slit-shaped metal mask, the distance between the subpixels of the same color which are adjacent to each other is decreased, so that the opening ratio can be increased.

In the case of manufacturing a high resolution OLED display device, that is, an OLED display device which individual subpixels are small, a metal mask having small openings is needed. Therefore, in the above-described slit-shaped metal mask, a wire may bent to be in contact with an adjacent wire, so that it is difficult to form a layer of a light-emitting material having a predetermined shape.

When manufacturing a high resolution OLED display device, even though the subpixels of the same color are arranged in a line, the slot-shaped metal mask obtained by forming a plurality of holes in the metal plate is used. As described above, in the slot-shaped metal mask, it is difficult to increase the opening ratio by decreasing the distance between the subpixels of the same color which are adjacent to each other.

In the pixel array of Patent Document 1, a slot-shaped metal mask manufacturing two adjacent subpixels of blue by one opening is used. Therefore, an effective area of the subpixel of blue can be increased. Namely, the pixel array of Patent Document 1 is a pixel array effective in increasing the opening ratio of a high resolution OLED display device.

However, the pixel array of Patent Document 1 is a pixel array including two types of pixels having different arrangements of subpixels of blue in the pixels. In a display device having such a pixel array, for example, in a case a black letter is displayed on white background, the edge of the letter may seem to be slightly colored.

Like this, a portion where color which should not be originally displayed is visible, is referred to as color edge in the description hereinafter. The color edge easily occurs when a high-contrast image such as a black letter, a black straight line, or a black point on white background is displayed. The color edge is the problem in using the pixel array of Patent Document 1.

SUMMARY

According to an aspect of the disclosure, there is provided a display device including: a display unit where a plurality of first pixels including subpixels of three colors and a plurality of second pixels including subpixels of the three colors are alternately arrayed in row and column directions, an arrangement of the subpixels in the first pixel and an arrangement of the subpixels in the second pixel being different from each other; and a luminance allocation unit which allocates luminance of a subpixel of a first color among the three colors in the first pixel to a subpixel of the first color in the second pixel adjacent to the first pixel with a predetermined ratio and allocates luminance of the subpixel of the first color in the second pixel to the subpixel of the first color in the first pixel adjacent to the second pixel with a predetermined ratio.

It is to be understood that both the foregoing general description and the following detailed description are exemplary and explanatory and are not restrictive of this disclosure.

DETAILED DESCRIPTION

First Embodiment

Figure 1:
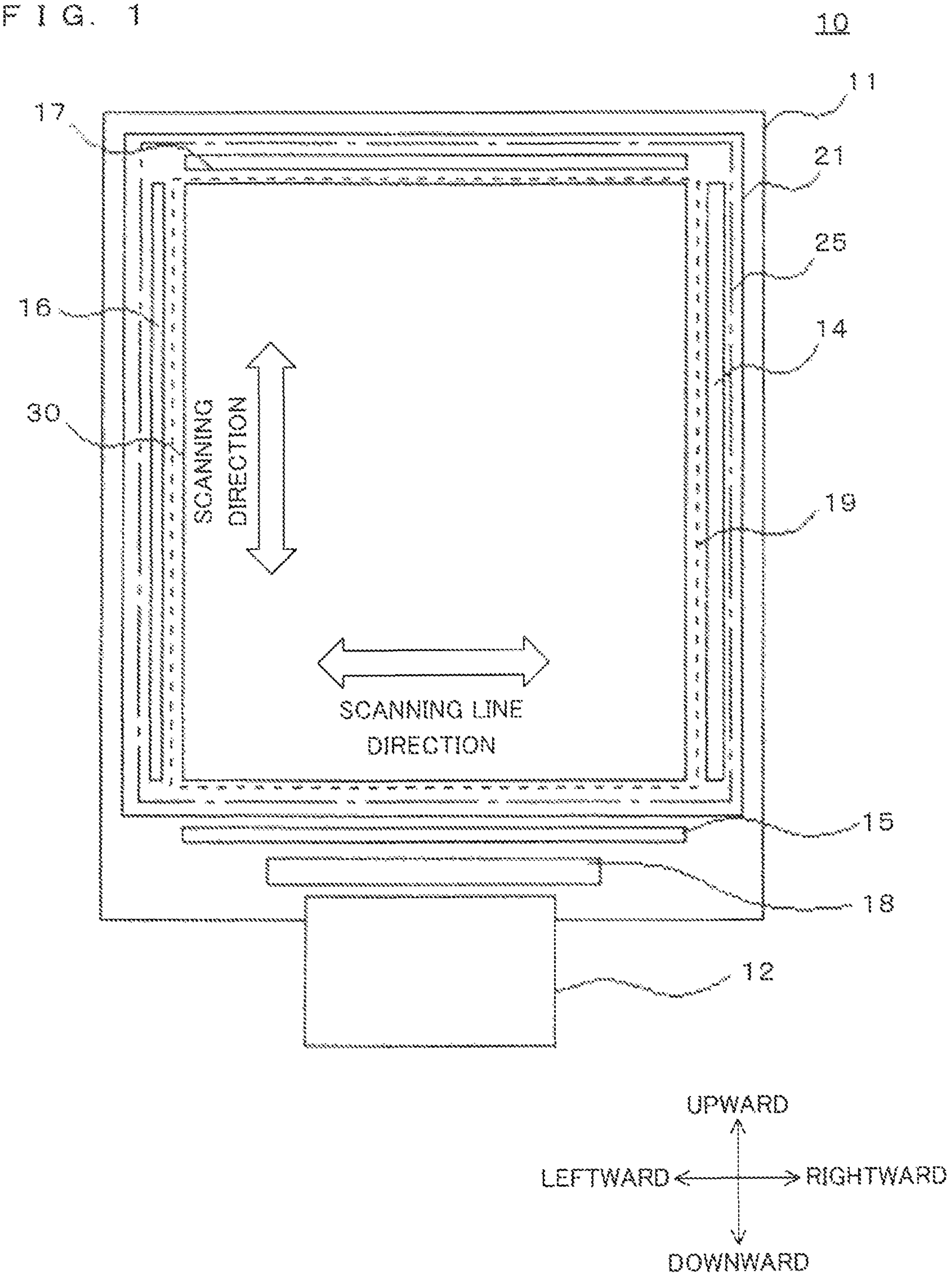
FIG. 1 is a diagram illustrating outer appearance of a display device.

FIG. 1 is a diagram illustrating outer appearance of a display device 10. FIG. 1 is a diagram as the display device 10 is seen from a front side, that is, a side of a surface displaying an image. The display device 10 is a device displaying a still image or a video, which is incorporated in various electronic apparatuses such as a smartphone, a mobile phone, a tablet, a PC, or a television set. In the description hereinafter, in each figure, various directions of forward, backward, leftward, rightward, upward, and downward indicated by arrows are used. The display device 10 according to the embodiment is an OLED panel. The display device 10 according to the embodiment has a rectangular shape which is elongated in the upward/downward direction and displays an image by scanning leftward/rightward scan lines in the upward/downward direction.

The display device 10 includes a rectangular thin film transistor (TFT) substrate 11 and a flexible printed circuit (FPC) 12. The TFT substrate 11 is a glass substrate which various circuits and connection terminals are formed on one side by a semiconductor manufacturing process.

Herein, features of the semiconductor manufacturing process will be described. Semiconductor integrated circuits such as an integrated circuit (IC) are manufactured by repeatedly performing processes such as film-forming, developing, or injecting trace element s on a surface of a plate such as a glass substrate or a silicon substrate. Manufacturing apparatuses suitable for the respective processes are commercialized, and the processes can be performed at positioning accuracy and size accuracy of a nano-micrometer level. A thermal annealing process, immersion into a highly reactive solution such as a hydrofluoric acid, or machining using a corrosive gas is repeatedly performed in order to improve quality of films or control device performance. The semiconductor manufacturing process having the above-described features is called a semiconductor process in the description hereinafter.

The FPC 12 is a soft substrate connected to the connection terminals formed in the TFT substrate 11. The FPC 12 is provided with a connector (not illustrated) connected to a control device of an electronic apparatus. The display device 10 acquires an image signal from the control device of the electronic apparatus through the connector provided to the FPC 12.

A rectangular display unit 30 is provided in a central portion of the TFT substrate 11. A plurality of pixels configured with three color subpixels are arrayed in the display unit 30, and anode electrodes 43 are independently formed for the respective subpixels. On the other hand, a common cathode electrode 19 is provided so as to cover the top surface of the display unit 30.

The cathode electrode 19 is a transparent electrode made of, for example, indium tin oxide (ITO), transparent conductive ink, or graphene. An arrangement of subpixels and a structure of the subpixel in the display unit 30 will be described later.

An emission control driver 14, a demultiplexer 15, a scan driver 16, and a protection circuit 17 are formed along four sides of the TFT circuit substrate by a semiconductor process. Hereinafter, an overview of the semiconductor circuit will be described.

The emission control driver 14 is formed along the right side of the TFT substrate 11. The emission control driver 14 is a circuit controlling emission time of each subpixel in the display unit 30 based on the image signal acquired through the FPC 12.

The demultiplexer 15 is formed along the lower side of the TFT substrate 11. The demultiplexer 15 returns data sequences with a high transmission rate which are acquired through the FPC 12 to a plurality of data sequences with an original transmission rate. The demultiplexer 15 simultaneously outputs signals of one scan line to the display unit 30.

The scan driver 16 is formed along the left side of the TFT substrate 11. The scan driver 16 is a circuit selecting and driving scan lines of the display unit 30 based on the image signal acquired through the FPC 12. The protection circuit 17 is a circuit preventing destruction of the display panel caused by electrostatic discharge.

The front side of the display unit 30, the emission control driver 14, the scan driver 16, and the protection circuit 17 is covered with a sealing plate 21. The sealing plate 21 is a rectangular transparent glass plate. A sealing portion 25 is provided along four sides of the sealing plate 21. The sealing portion 25 is a portion hermetically connecting the TFT substrate 11 and the sealing plate 21. The sealing portion 25 is formed, for example, by bonding process, in which low-melting-point glass powder (e.g. glass frit) melted and hardened.

A driver IC 18 is mounted in the lower side of the demultiplexer 15. The driver IC 18 is an integrated circuit processing an image signal acquired through the FPC 12 to control the emission control driver 14, the demultiplexer 15, and the scan driver 16. Terminals of the driver IC 18 are connected to the respective connection terminals provided to the TFT substrate 11 through, for example, anisotropic conductive films (not illustrated).

Figure 2:
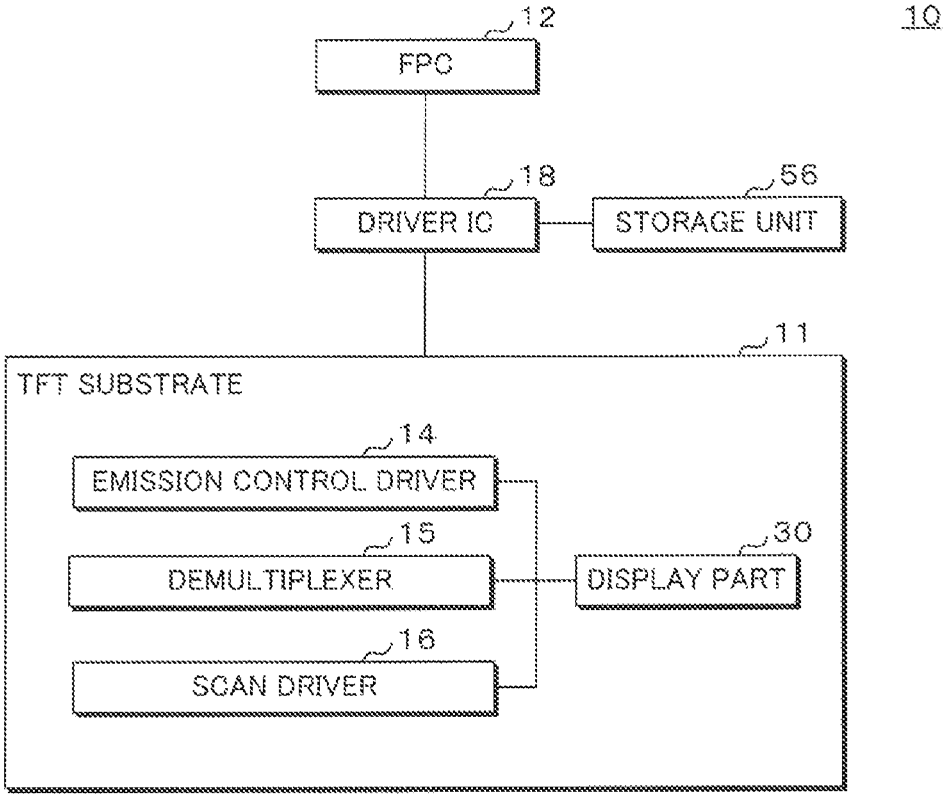
FIG. 2 is a diagram illustrating a configuration of the display device.

FIG. 2 is a diagram illustrating a configuration of the display device 10. More specifically, FIG. 2 illustrates a hardware configuration of the display device 10. The driver IC 18 is connected between the FPC 12 and the TFT substrate 11.

A storage unit 56 is connected to the driver IC 18. The storage unit 56 is a storage device such as a static random access memory (SRAM), a dynamic random access memory (DRAM), or a flash memory. The storage unit 56 may be installed inside the driver IC 18.

The image signal acquired through the FPC 12 is processed by the driver IC 18 to be input to the emission control driver 14, the demultiplexer 15, and the scan driver 16 of the TFT substrate 11. Emission states of the subpixels in the display unit 30 are controlled by the emission control driver 14, the demultiplexer 15, and the scan driver 16. Correspondence between the signals output from the driver IC and the signals input to the emission control driver 14, the demultiplexer 15, and the scan driver 16 will be described later.

Figure 3:
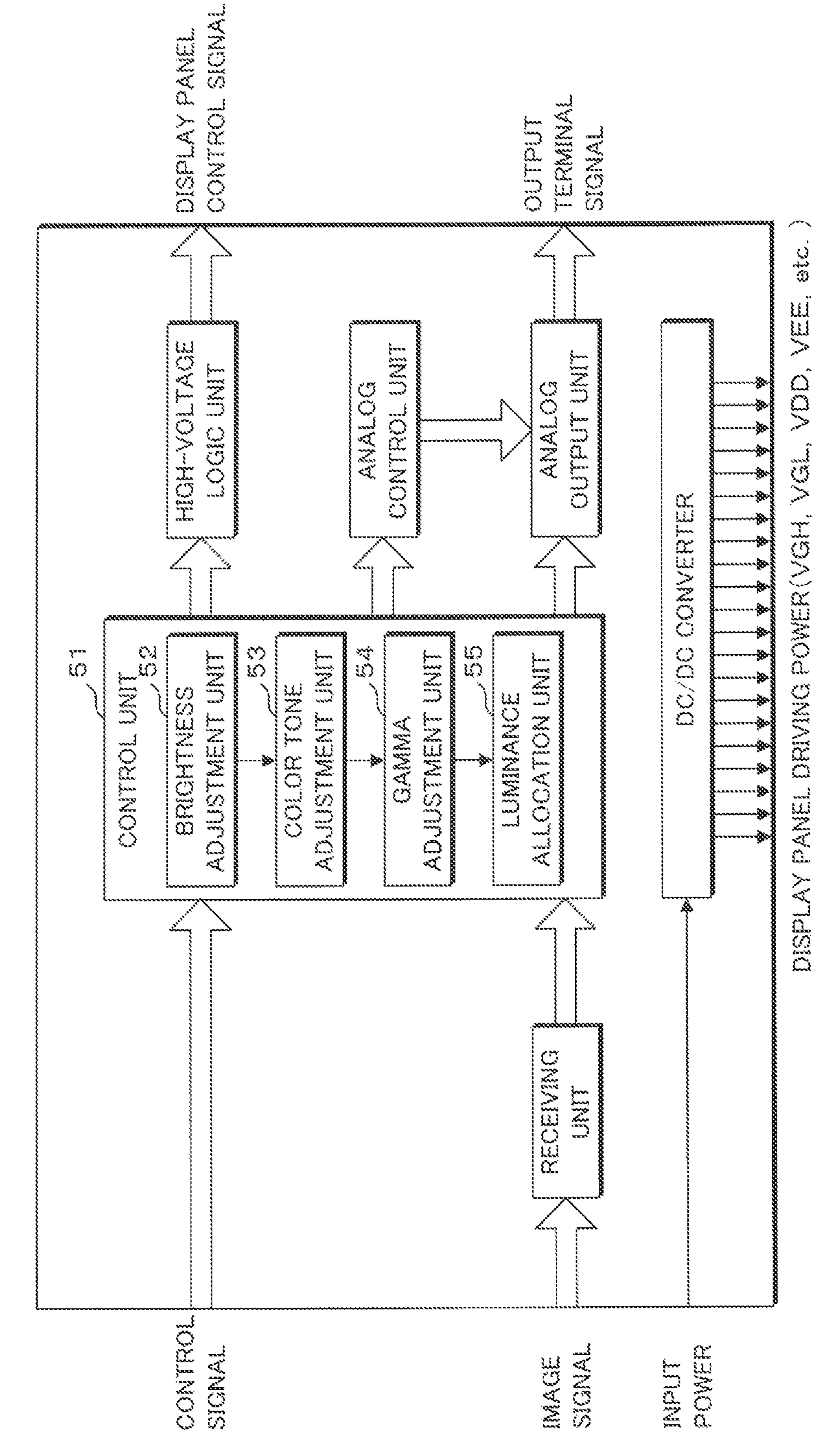
FIG. 3 is a diagram illustrating a configuration of a driver IC.

FIG. 3 is a diagram illustrating a configuration of the driver IC 18. The driver IC 18 comprises a control unit 51, a receiving unit, a high-voltage logic unit, an analog control unit, an analog output unit, and a DC/DC converter. The control unit 51 is a low-voltage logic circuit which can operate at a high speed. The control unit 51 includes a brightness adjustment unit 52, a color tone adjustment unit 53, a gamma adjustment unit 54, and a luminance allocation unit 55. The brightness adjustment unit 52, the color tone adjustment unit 53, the gamma adjustment unit 54, and the luminance allocation unit 55 are implemented by a brightness adjustment circuit, a color tone adjustment circuit, a gamma adjustment circuit, and a luminance allocation circuit, respectively.

The control unit 51 may be a processor embedded in the driver IC 18. In this case, the control unit 51 reads out a control program from the storage unit 56 or a non-volatile storage device (not illustrated) installed in the driver IC and expands the control program on the DRAM (not illustrated) or the like embedded in the driver IC 18 to execute the control program. By doing so, the brightness adjustment unit 52, the color tone adjustment unit 53, the gamma adjustment unit 54, and the luminance allocation unit 55 are performed.

A control signal, an image signal, and an input power are supplied to the driver IC 18 through the FPC 12. The image signal is a signal in accordance with a standard defined by, for example, mobile industry processor interface (MIPI) alliance.

The image signal is input through the receiving unit to the control unit 51. The image signal is sequentially processed by the brightness adjustment unit 52, the color tone adjustment unit 53, and the gamma adjustment unit 54 based on the control signal, so that the image signal is adjusted so as to be a signal in accordance with the characteristics of the display device 10. After that, a luminance allocation process for each pixel is performed by the luminance allocation unit 55. The luminance allocation process will be described later.

The high voltage logic unit processes the image signal processed by the control unit 51, and outputs a display panel control signal. The display panel control signal is a high-voltage digital signal. The display panel control signal is transmitted through wire lines of the TFT substrate 11 to the emission control driver 14, the demultiplexer 15, and the scan driver 16 (refer to FIG. 2). The signal transmitted to the emission control driver 14 and the scan driver 16 functions as an input signal for two drivers. The signal transmitted to the demultiplexer 15 functions as a timing control signal for the demultiplexer 15.

The analog control unit and the analog output unit process the image signal processed by the control unit 51, and output an output terminal signal. The output terminal signal is an analog signal. The output terminal signal is transmitted through the wire lines of the TFT substrate 11 to the demultiplexer 15 and functions as an analog input signal for the demultiplexer 15.

The DC/DC converter outputs a display panel driving power based on the image signal processed by the control unit 51 and the input power. The display panel driving power is supplied to each circuit on the TFT substrate and operates them. The analog control unit and the analog output unit process the image signal processed by the control unit 51, and output an output terminal signal. The output terminal signal is an analog signal. The output terminal signal is transmitted through the wire lines of the TFT substrate 11 to the demultiplexer 15 and functions as an analog input signal for the demultiplexer 15.

Each subpixel in the display unit 30 is controlled by the emission control driver 14, the demultiplexer 15, and the scan driver 16, so that an image is displayed on the display unit 30.

Figure 4:
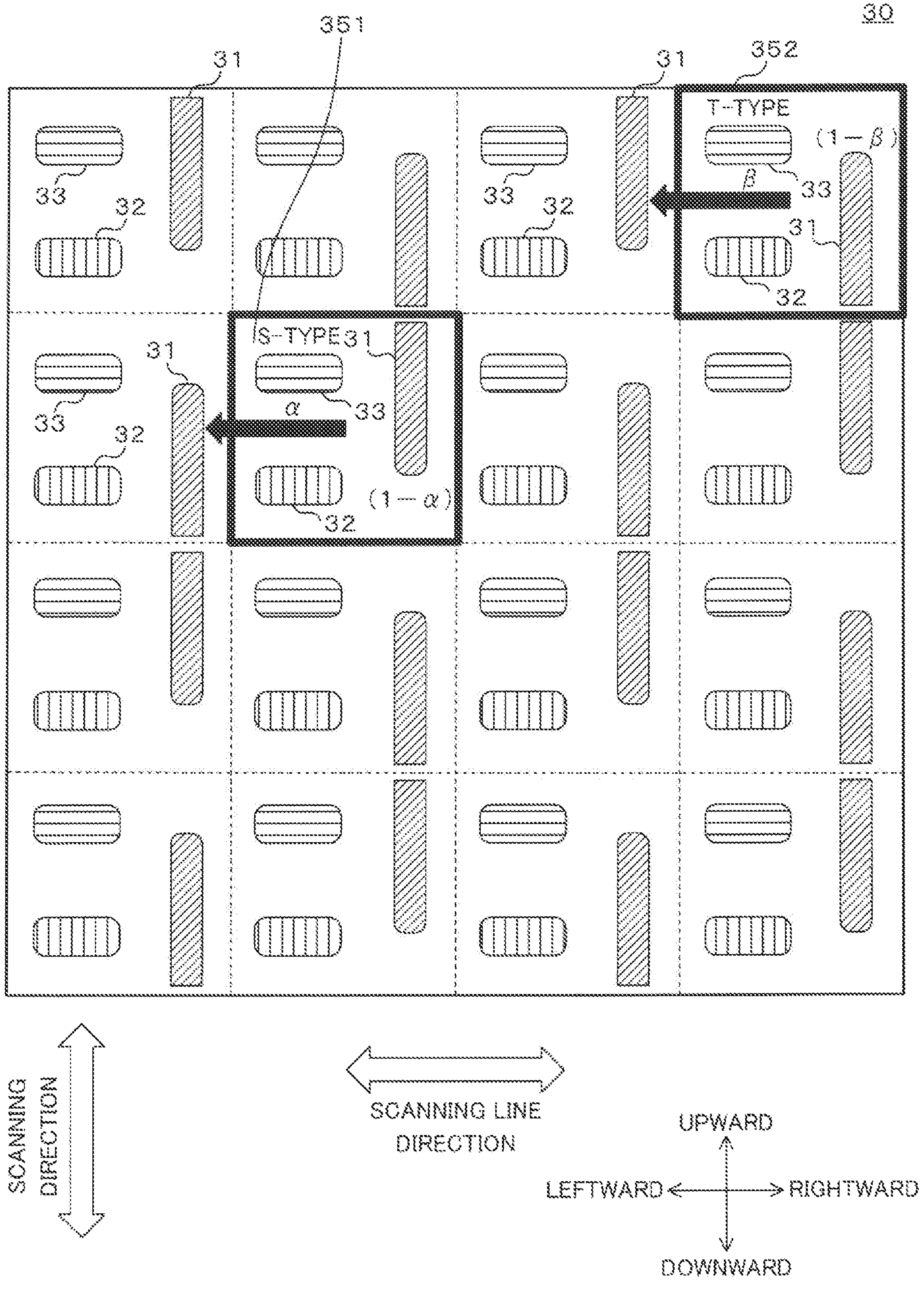
FIG. 4 is a diagram illustrating an arrangement of pixels as improvement of an array of pixels according to Patent Document 1 and allocation of luminance.

FIG. 4 is a diagram illustrating an arrangement of pixels as improvement of an array of pixels according to Patent Document 1 and allocation of luminance. FIG. 4 illustrates a partial expanded diagram as seen from the front side of the display unit 30. In the display unit 30, pixels having three subpixels of a first subpixel 31, a second subpixel 32, and a third subpixel 33 are arranged in a matrix.

First, the subpixels will be described. The first subpixel 31 is a subpixel emitting light of a first color. The second subpixel 32 is a subpixel emitting light of a second color. The third subpixel 33 is a subpixel emitting light of a third color. In the display device 10 according to the embodiment, for example, the first color is blue, the second color is green, and the third color is red.

The first subpixels 31 are arranged in a column shape in the upward/downward direction. The two first subpixels 31 are close to each other in the upward/downward direction to constitute one pair. Each of the first subpixels 31 is a rectangle elongated in the upward/downward direction, where two corners at the short side adjacent to the subpixel in the same pair are rectangular and the other two corners are round.

The second subpixel 32 and the third subpixel 33 are rounded rectangles elongated in the leftward/rightward direction. The second subpixel 32 and the third subpixel 33 have the same size. The second subpixel 32 and the third subpixel 33 are alternately arranged in the upward/downward direction.

The columns where the first subpixels 31 are arranged and the columns where the second subpixels 32 and the third subpixels 33 are arranged are alternately arranged in the leftward/rightward direction. Referring to only the columns where the second subpixels 32 and the third subpixels 33 are arranged, the second subpixels 32 and the third subpixels 33 are arranged along the longitudinal directions of each subpixel, respectively.

A set of the three subpixels of the first subpixel 31, the second subpixel 32, and the third subpixel 33 which are adjacent to each other is one pixel. A color and luminance of the pixel are determined by a combination of the luminances of the first subpixel 31, the second subpixel 32, and the third subpixel 33. For example, in the case the luminances of all the subpixels have maximum values, the color of the pixel becomes white.

The display unit 30 includes two types of pixels, that is, a first pixel 351 and a second pixel 352. In the description hereinafter, the first pixel 351 is called an S-type pixel 351, and the second pixel 352 is called a T-type pixel 352. The boundary lines of the pixels illustrated in FIG. 4 are virtual lines for the description, and any member representing the boundary lines between the pixels does not exist in the display unit 30. A combination of the subpixels included in one pixel is determined by the control of the driver IC 18. The boundary lines of the pixels indicated by broken lines in FIG. 4 are lines passing through central portions between the adjacent pixels.

Any one of the S-type pixel 351 and the T-type pixel 352 is a square. The first subpixel 31 is arranged along the right side of the square, the second subpixel 32 is arranged in the lower portion along the left side thereof, and the third subpixel 33 is arranged in the upper portion along the left side thereof. In the S-type pixel 351, the first subpixel 31 is closer to the upper side. In the T-type pixel 352, the first subpixel 31 is closer to the lower side. In the display unit 30, the S-type pixels 351 and the T-type pixels 352 are alternately arrayed in row and column directions.

The luminances of the subpixels can be determined based on the colors and luminances of the pixels in the image signal acquired through the FPC 12. However, in a case where the luminances determined in this manner are used as they are, color edge is likely to occur. It occurs due to the arrangement of the first subpixel 31 in the T-type pixels 352 is different from the arrangement of the first subpixel 31 in the S-type pixels 351. The color edge is easier to be found in a case where a high-contrast image such as a black letter, straight line, or point is displayed on white background. Therefore, in the embodiment, as indicated by thick arrows in FIG. 4, the luminance allocation unit 55 allocates a portion of the luminance of the first subpixel 31 to the first subpixel 31 of the adjacent left pixel.

More specifically, the luminance allocation unit 55 adds α times the luminance of the first subpixel 31 of the S-type pixel 351 determined based on the image signal to the luminance of the first subpixel 31 of the adjacent left pixel and decreases the luminance of the first subpixel 31 of the original pixel by the aforementioned amount. Namely, the luminance of the first subpixel 31 of the original pixel becomes (1−α) times the luminance determined based on the image signal. The luminance allocation unit 55 adds β times the luminance of the first subpixel 31 of the T-type pixel 352 determined based on the image signal to the luminance of the first subpixel 31 of the adjacent left pixel and decreases the luminance of the first subpixel 31 of the original pixel by the aforementioned amount. Namely, the luminance of the first subpixel 31 of the original pixel becomes (1−β) times the luminance determined based on the image signal. In the embodiment, the luminance allocation unit 55 performs this process on all the pixels. Herein, α and β are constants of 0 or more and 1 or less. The second subpixel 32 and the third subpixel 33 display the luminances determined based on the image signal as they are.

Figure 5A:
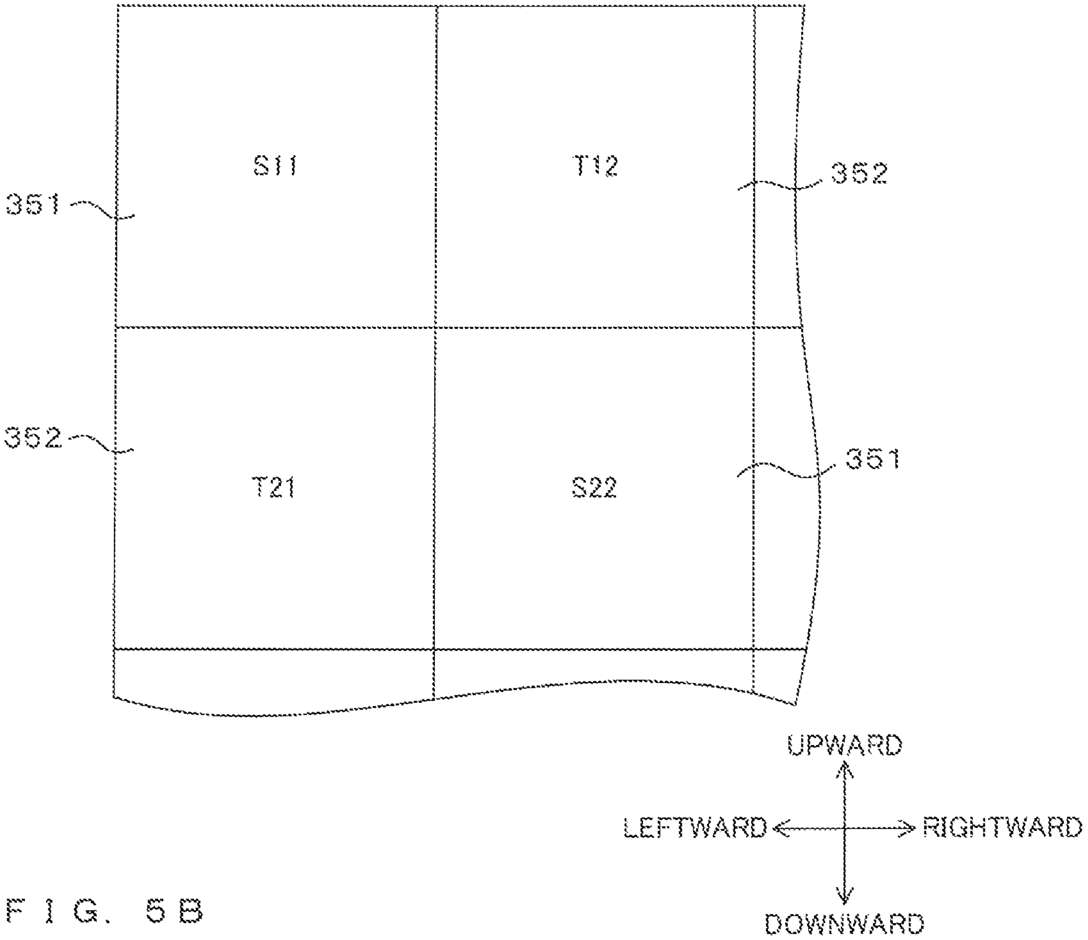
FIGS. 5A and 5B are diagrams illustrating allocation of luminance.
Figure 5B:
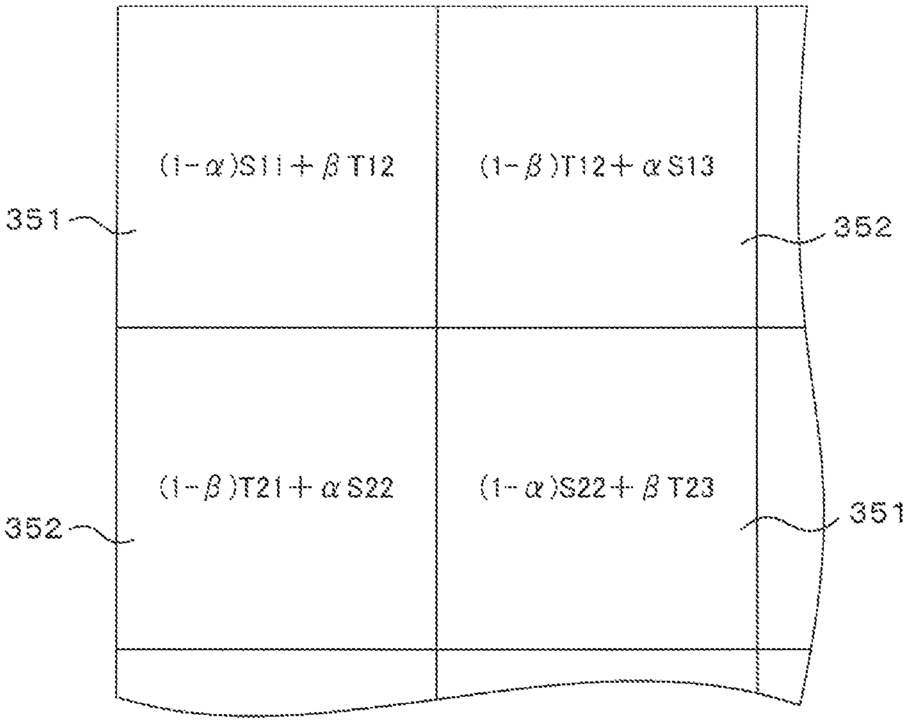

FIGS. 5A and 5B are diagrams illustrating allocation of luminance. FIGS. 5A and 5B illustrates the luminances of the first subpixels 31 in the four pixels in the upper left portion of FIG. 4. FIG. 5A illustrates the luminances of the first subpixels 31 determined based on the image signal. The luminance of the first subpixel 31 of the S-type pixel 351 in the upper left portion is S11, the luminance of the first subpixel 31 of the T-type pixel 352 in the upper right portion is T12, the luminance of the first subpixel 31 of the T-type pixel 352 in the lower left portion is T21, and the luminance of the first subpixel 31 of the S-type pixel 351 in the lower right portion is S22.

FIG. 5B illustrates the luminances of the first subpixels 31 after the luminance allocation unit 55 performs the luminance allocation described with reference to FIG. 4. The luminance of the first subpixel 31 of the S-type pixel 351 in the upper left portion is (1−α) S11+β T12. The luminance of the first subpixel 31 of the T-type pixel 352 in the upper right portion is (1−β) T12+αS13. The luminance of the first subpixel 31 of the T-type pixel 352 in the lower left portion is (1−β) T21+α S22. The luminance of the first subpixel 31 of the S-type pixel 351 in the lower right portion is (1−α) S22+β T23.

Table 1 lists an example of a preferred combination of a and 13 that were found by the applicant of the disclosure through many studies. By using values of a and 13 listed in Table 1, the color edge can be reduced so that the color edge is hardly conspicuous.

TABLE 1

| No. | α | β |
|---|---|---|
| 1 | 0.6 | 0.4 |

The values of α and β listed in Table 1 are an example of preferred values. In some cases, the preferred values of α and β may be different from the values of Table 1 according to the arrangement of the subpixels or according to the image displayed on the display unit 30.

Figure 6:
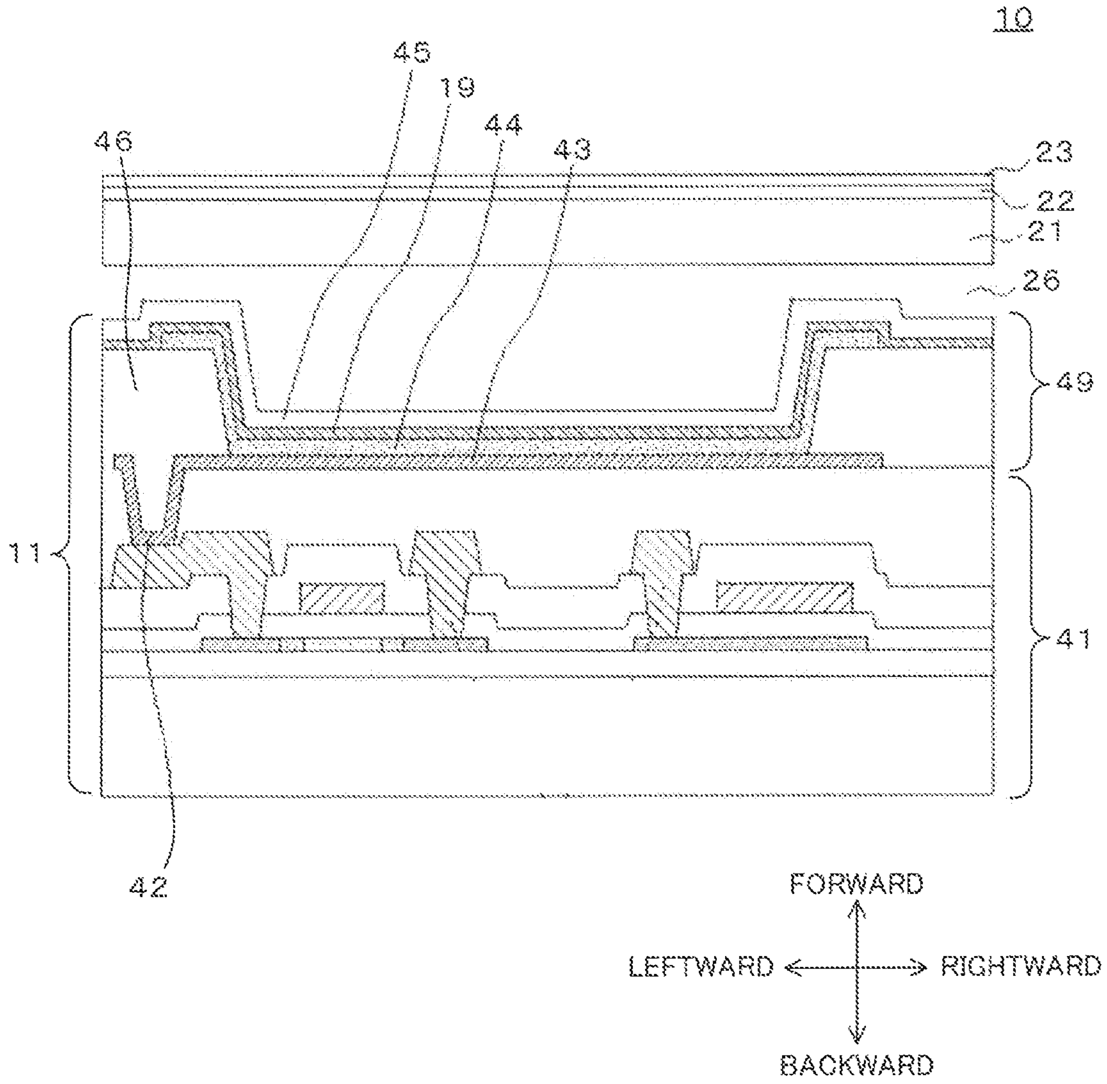
FIG. 6 is a schematic cross sectional diagram illustrating arrangement of components of a subpixel in a display device.

Herein, the reason why the arrangement of the subpixels illustrated in FIG. 4 is to be performed will be described. First, an overview of a structure of a subpixel in an OLED panel will be described. FIG. 6 is a schematic cross sectional diagram illustrating arrangement of components of a subpixel in the display device 10.

FIG. 6 schematically illustrates a cross-sectional diagram obtained by cutting one subpixel in the display device 10 along a plane perpendicular to the plane displaying an image. As described above, the display device 10 includes the TFT substrate 11 and the sealing plate 21. Dry air 26 is sealed in the space between the TFT substrate 11 and the sealing plate 21. A ¼-wavelength phase difference plate 22 and a polarizing plate 23 are installed on the front side of the sealing plate 21.

The TFT substrate 11 includes a wiring portion 41 and a pixel array portion 49. A TFT circuit output connection portion 42 and electronic circuits which connect the demultiplexer 15 and the scan driver 16 with the subpixels to retain charges for a predetermined time period are formed in the wiring portion 41 by a semiconductor process. Shapes and structures of wiring patterns of the wiring portion 41 are already used in various display devices, and thus, the description thereof is omitted.

The wiring portion 41 and the pixel array portion 49 are connected to each other by the TFT circuit output connection portion 42. One TFT circuit output connection portion 42 is provided to one subpixel.

The pixel array portion 49 includes an anode electrode 43, an OLED layer 44, a cathode electrode 19, a cap layer 45, and an isolation portion 46. Each of the subpixels includes a pixel circuit, an organic light emitting element which includes the anode electrode 43, the cathode electrode 19 and an organic light emitting layer (OLED layer) disposed between the anode electrode 43 and the cathode electrode 19.

The anode electrode 43 is a substantially rectangular electrode installed on the front side of the wiring portion 41 for every one subpixel. One anode electrode 43 is connected to one TFT circuit output connection portion 42. In the description hereinafter, an OLED layer 44 may be referred to as an organic light emitting layer.

The isolation portion 46 is installed on the front side of the anode electrode 43. The isolation portion 46 is an insulating layer having openings corresponding to the shapes of the first subpixel 31, the second subpixel 32, and the third subpixel 33 illustrated in FIG. 4.

The OLED layer 44 is installed on the front side of the anode electrode 43 exposed from the opening installed in the isolation portion 46 and the edge of the opening installed in the isolation portion 46 to constitute the subpixel. The OLED layer 44 is a material emitting light of one of colors of the first color, the second color, and the third color if a voltage is applied.

The cathode electrode 19 is installed on the front side of the OLED layer 44 and the isolation portion 46. As described above, the cathode electrode 19 is a transparent electrode continuously covering the subpixels included in the display unit 30.

The cap layer 45 is installed on the front side of the cathode electrode 19. Similarly to the cathode electrode 19, the cap layer 45 continuously covers the subpixels. The cap layer 45 is a layer made of a transparent material having a high refractive index.

The operations of the subpixel will be described. By the functions of the demultiplexer 15 and the scan driver 16, the TFT circuit output connection portion 42 connected to a subpixel which is to emit light is operated, so that a voltage is applied to the anode electrode 43. The voltage applied to the anode electrode 43 is a high voltage when the subpixel is to emit light with a high luminance, and the voltage is a low voltage when the subpixel is to emit light with a low luminance.

By a potential difference between the anode electrode 43 and the cathode electrode 19, the OLED layer 44 interposed between the two electrodes, that is, the OLED layer 44 inside the opening installed in the isolation portion 46 emits light. The cap layer 45, the dry air 26, and the sealing plate 21 fulfill a function as a protective layer of preventing the OLED layer 44 from being deteriorated by moisture and destructed by an external force.

Figure 7:
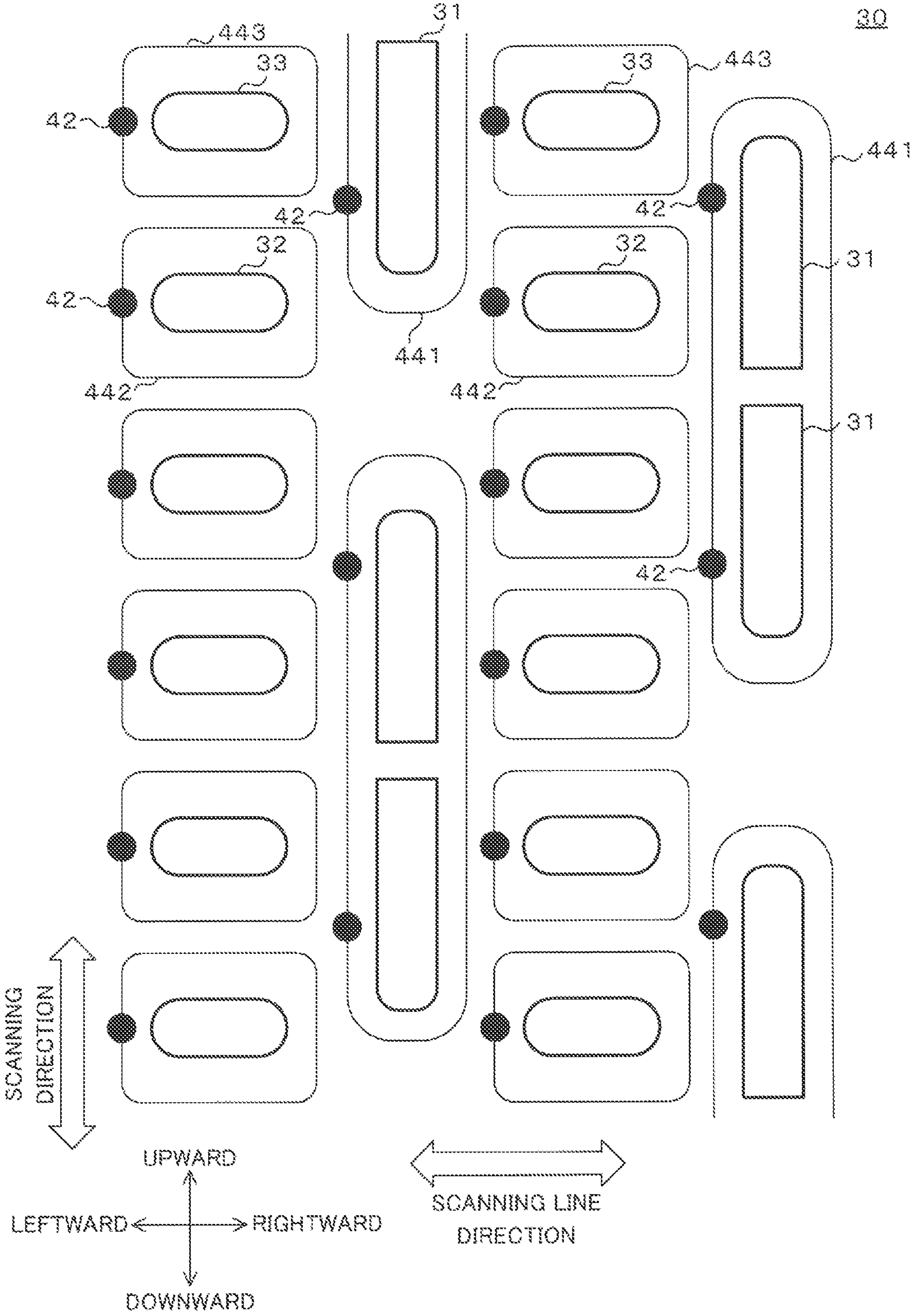
FIG. 7 is a diagram illustrating an array of subpixels.

The arrangement of the OLED layers 44 will be described. FIG. 7 is a diagram illustrating an array of subpixels. FIG. 7 schematically illustrates the array of subpixels as a plan diagram. FIG. 7 is a diagram illustrating the first subpixel 31, the second subpixel 32, the third subpixel 33, the TFT circuit output connection portion 42, the first OLED layer 441, the second OLED layer 442, and the third OLED layer 443 of the same portions as the portions of the display unit 30 illustrated in FIG. 4. The first OLED layer 441 is the OLED layer 44 of the first color. Similarly, the second OLED layer 442 is the OLED layer 44 of the second color, and the third OLED layer 443 is the OLED layer 44 of the third color.

One piece of the first OLED layer 441 is formed over the two first subpixels 31 which are adjacent in upward/downward direction. One piece of the second OLED layer 442 is formed for one second subpixel 32. Similarly, one piece of the third OLED layer 443 is formed for one third subpixel 33.

One TFT circuit output connection portion 42 is arranged in the vicinity of each subpixel. The TFT circuit output connection portion 42 is a portion of extracting an output of a TFT circuit where the same pixel circuit arrangement pattern is repeatedly arranged and applying the output to the anode electrode 43. The TFT circuit output connection portion is arranged at the same portion without being changed according to the position of the anode electrode arrangement pattern of the OLED layer 44. As a result, although the positions of the anode electrodes 43 are deviated according to the column in the upward/downward direction similarly to the deposition pattern of the first OLED layer 441, since the condition of the TFT circuit can be maintained to be the same, uniform emission can be obtained.

Figure 8:
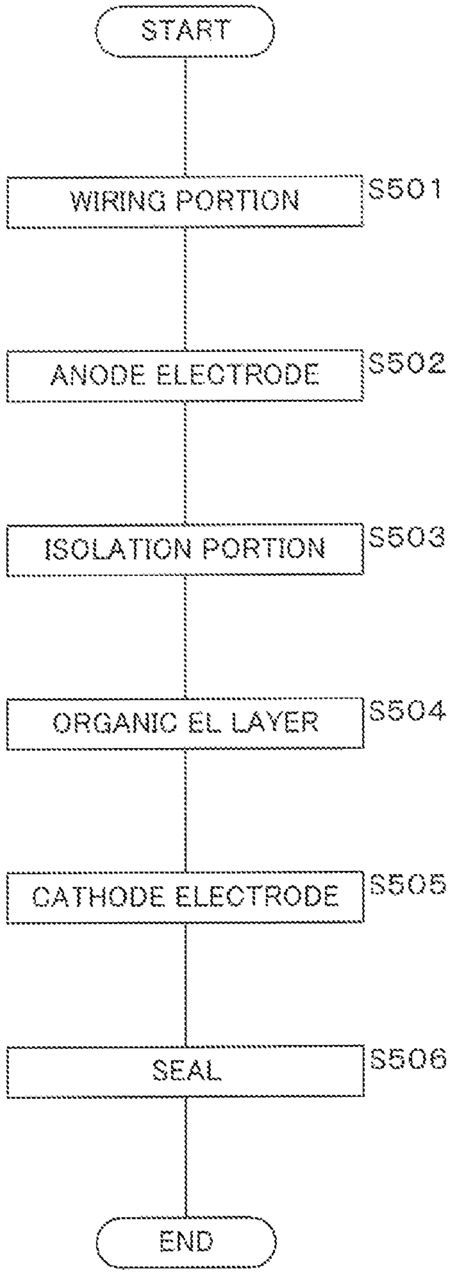
FIG. 8 is a flowchart illustrating a process of manufacturing an OLED panel.

FIG. 8 is a flowchart illustrating a process of manufacturing an OLED panel. A method of manufacturing the display device 10 according to the embodiment will be described in brief with reference to FIG. 8. Semiconductor manufacturing apparatuses used for manufacturing the display device 10 such as a vapor deposition apparatus, a sputtering apparatus, a spin coat apparatus, an exposure apparatus, a developing apparatus, an etching apparatus, a sealing system, a cutting apparatus, and a transport apparatus connecting these apparatuses are not illustrated. These apparatuses are operated according to a predetermined program.

A manufacturer of the display device 10 manufactures the wiring portion 41 on a substrate made of a glass by using a semiconductor process (step S501). At this time, the emission control driver 14, the demultiplexer 15, the scan driver 16, and the protection circuit 17 are also manufactured. The process of step S501 will be described in detail later. In steps described hereinafter, processes on the surface of the glass substrate where the wiring portion 41 is manufactured are performed.

The semiconductor manufacturing apparatus manufactures the TFT circuit output connection portion 42 and the anode electrode 43 (step S502). More specifically, for example, after a vapor deposition apparatus forms a metal film, a spin coat apparatus, an exposure apparatus, a developing apparatus, and an etching apparatus removes unnecessary portions of the metal film, so that the TFT circuit output connection portion 42 and the anode electrode 43 are formed.

The semiconductor manufacturing apparatus manufactures the isolation portion 46 (step S503). More specifically, for example, after the spin coat apparatus deposits a photosensitive organic resin film, the exposure apparatus performs exposure with a predetermined pattern, and the developing apparatus and the etching apparatus removes unnecessary portions, so that the isolation portion 46 is manufactured.

The semiconductor manufacturing apparatus manufactures the OLED layer 44 (step S504). Since a material for the OLED layer 44 is an organic material, it is difficult to form the OLED layer by a semiconductor process including a thermal annealing process, immersion into a highly reactive solution, machining using a corrosive gas, or the like. Therefore, in the state that the anode electrode 43 and the isolation portion 46 are covered with a metal mask including openings having a shape of the first OLED layer 441 described with reference to FIG. 7, the vapor deposition apparatus performs deposition of the first OLED layer 441. After that, in the state that the anode electrode 43 and the isolation portion 46 are covered with a metal mask including openings having a shape of the second OLED layer 442, the vapor deposition apparatus performs deposition of the second OLED layer 442. In the state that the anode electrode 43 and the isolation portion 46 are covered with a metal mask including openings having a shape of the third OLED layer 443, the vapor deposition apparatus performs deposition of the third OLED layer 443. The shapes of the metal masks and the structures of the OLED layers 44 will be described in detail later.

The manufacturing order of the first OLED layer 441, the second OLED layer 442, and the third OLED layer 443 may be changed.

The vapor deposition apparatus sequentially manufactures the cathode electrode 19 and the cap layer 45 (step S505). Since the cathode electrode 19 and the cap layer 45 are layers spreading over the entire display unit 30, the cathode electrode and the cap layer do not need to be manufactured at a high accuracy.

After the sealing plate 21 of which the one side is provided with the ¼-wavelength phase difference plate 22 and the polarizing plate 23 is attached on the front side of the display unit 30, the sealing apparatus hermetically seals the edge of the sealing plate 21 (step S506). The OLED panel is completed by the above processes.

The ¼-wavelength phase difference plate 22 and the polarizing plate 23 may be provided on the surface of the sealing plate 21 after step S506. A plurality of TFT substrates 11 formed on one large glass substrate may be cut into a predetermined size by the cutting apparatus between step S505 and step S506 or after step S506.

The shape of the metal mask used at the time of manufacturing the OLED layer 44 in step S504 will be described. As described above, since it is difficult to use a semiconductor process in the process of step S504, the size accuracy and positioning accuracy of the mask are much lower than those of step S501 to step S503. Therefore, in order to securely cover the opening provided to the isolation portion 46 with the organic EL material, the opening having a sufficiently large size needs to be provided to the mask used in the process. On the other hand, in order to avoid mixing of the OLED layers 44 of adjacent colors, the openings provided to the isolation portion 46 need to be sufficiently separated from each other.

Here, in order to obtain a bright display device 10, the light-emitting portion of each subpixel is preferably large. In order to increase the life cycle of the subpixel of the OLED panel, the light-emitting portion thereof is also preferably large. On the other hand, in order to obtain a high resolution display device 10, the size of each pixel is preferably small.

The arrangement of subpixels illustrated in FIG. 4 is an arrangement which enables the area of the light-emitting portion of the subpixel to be large in the display device 10 having a small pixel size. This will be described more in detail with reference to FIGS. 4, 6, and 7. The first OLED layers 441 of the adjacent two first subpixels 31 are manufactured by one opening of the metal mask, so that the width of the isolation portion 46 between the two first subpixels 31 can be decreased. The light-emitting portion of the first subpixel 31 can be increased by the decreased amount of the width of the isolation portion 46.

Figure 9:
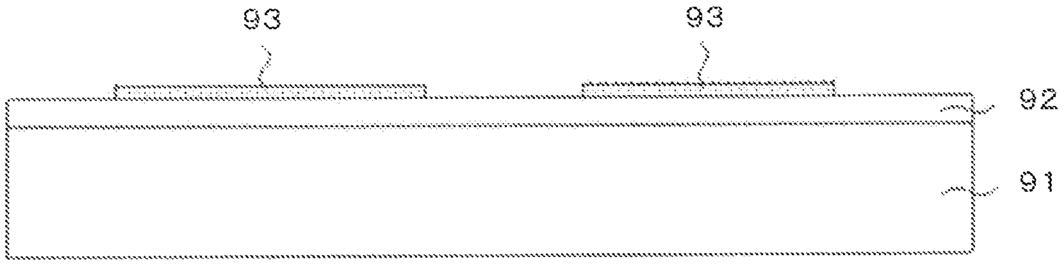
FIG. 9 is a diagram illustrating a process of manufacturing a wiring portion.
Figure 9:
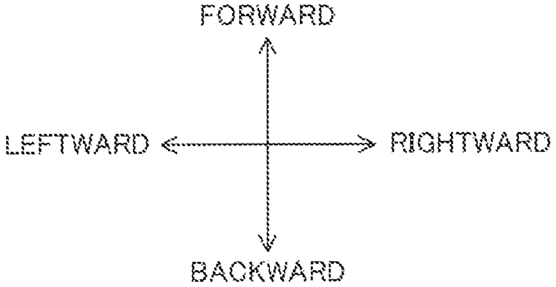
Figure 10:
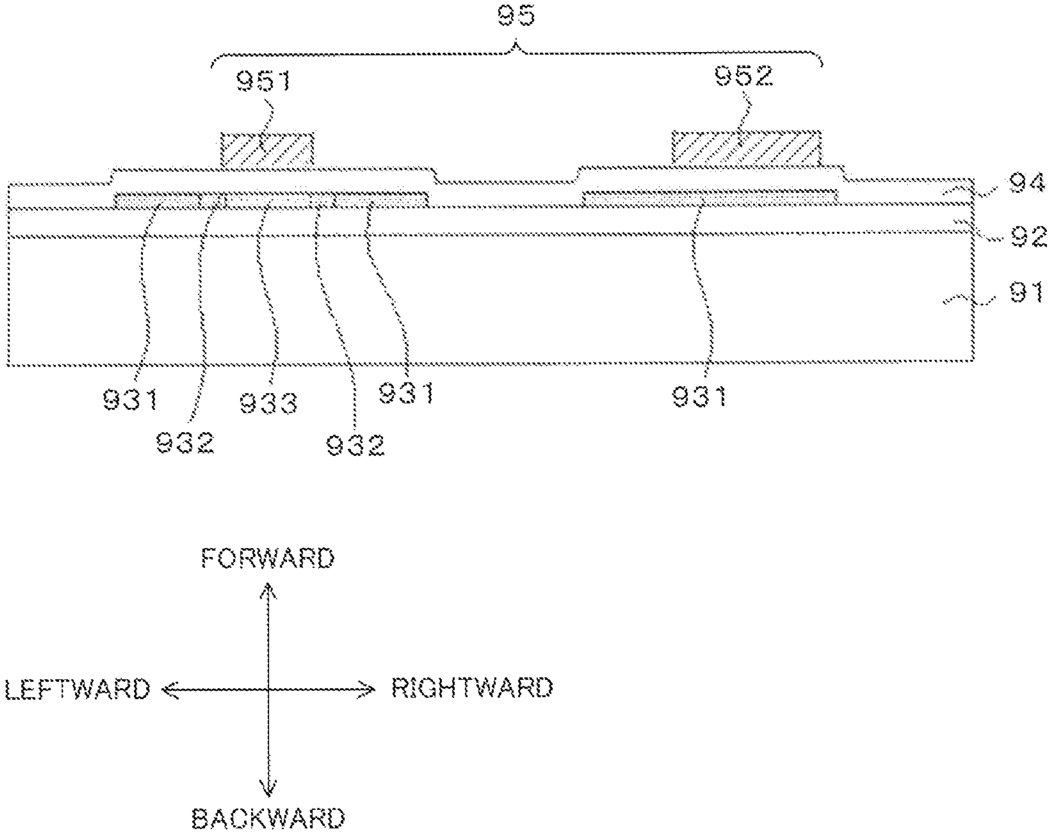
FIG. 10 is a diagram illustrating a process of manufacturing a wiring portion.
Figure 11:
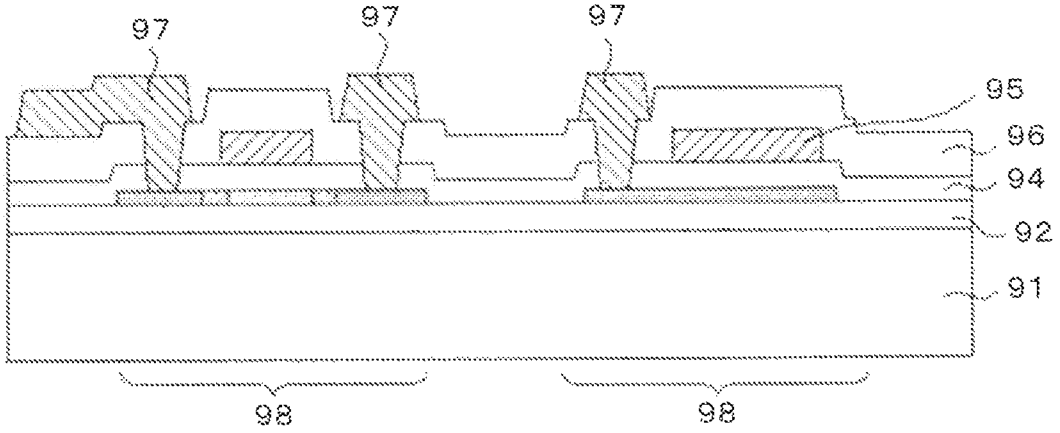
FIG. 11 is a diagram illustrating a process of manufacturing a wiring portion.
Figure 11:
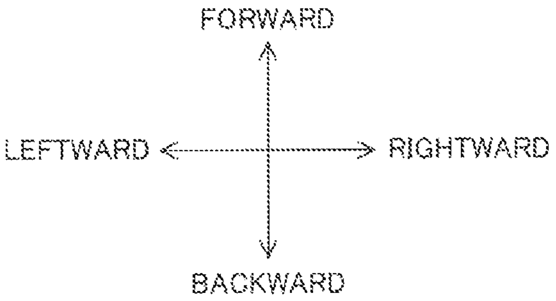

The process of manufacturing the wiring portion 41 in step S501 will be described more in detail. Hereinafter, the wiring portion 41 of one subpixel will be described as an example. The processes of manufacturing the emission control driver 14, the demultiplexer 15, the scan driver 16, and the protection circuit 17 are the same as those of an integrated circuit used in the related art, and thus, the description thereof is omitted. FIGS. 9 to 11 are diagrams illustrating the process of manufacturing the wiring portion 41.

First, the process will be described with reference to FIG. 9. The semiconductor manufacturing apparatus forms a base insulating film 92 by depositing, for example, a silicon nitride film or the like on the one side of a transparent substrate 91 such as a glass substrate through a chemical vapor deposition (CVD) method or the like. Next, the semiconductor manufacturing apparatus forms a polysilicon layer 93, by depositing amorphous silicon on the base insulating film 92 by using a CVD method or the like and performing crystallization by excimer laser annealing (ELA).

The process will be continuously descried with reference to FIG. 10. The semiconductor manufacturing apparatus forms a gate insulating film 94 by depositing, for example, a silicon oxide film or the like on the polysilicon layer 93 by using a CVD method or the like. The semiconductor manufacturing apparatus forms a high-concentration impurity layer 931 having a predetermined shape by a doping process of adding impurities to the polysilicon layer 93 from the position above the gate insulating film 94. The semiconductor manufacturing apparatus laminates a first metal layer 95 on the gate insulating film 94 by using a sputtering method or the like. The first metal layer 95 includes a TFT gate electrode 951 and a storage capacitor electrode 952.

The semiconductor manufacturing apparatus forms a low-concentration impurity layer 932 having a predetermined shape by performing an additional doping process of adding additional impurities to the polysilicon layer by using the first metal layer 95 as a mask. The portion where the impurities are not added becomes an undoped layer 933.

The process will be continuously descried with reference to FIG. 11. The semiconductor manufacturing apparatus forms an interlayer insulating film 96 by depositing, for example, a silicon oxide film or the like by using a CVD method or the like. The semiconductor manufacturing apparatus forms through-holes penetrating down to the polysilicon layer 93 by performing anisotropic etching on the interlayer insulating film 96 and the gate insulating film 94. The semiconductor manufacturing apparatus laminates a second metal layer 97 having a predetermined shape by using a sputtering method or the like.

The semiconductor manufacturing apparatus forms a planarized film by depositing a photosensitive organic material by using a spin coat method or the like. The semiconductor manufacturing apparatus forms through-holes penetrating down to the second metal layer 97 by anisotropic etching or the like. The process of manufacturing the wiring portion 41 is ended, and thus, a TFT portion 98 and a storage capacitor portion 99 are completed.

Although one TFT portion 98 is illustrated in FIGS. 6, 9, 10, and 11, the two TFT portions 98 of a switching TFT and a driving TFT described later are arranged to one subpixel.

The structure of the OLED layer 44 in step S504 will be described more in detail. The OLED layer 44 is a stacked structure configured by stacking, for example, a hole injection layer, a hole transport layer, a light-emitting layer, an electron transport layer, an electron injection layer, and the like in the order from the bottom layer. The OLED layer 44 may be any one of a structure of electron transport layer/light-emitting layer/hole transport layer, a structure of electron transport layer/light-emitting layer/hole transport layer/hole injection layer, a structure of electron injection layer/electron transport layer/light-emitting layer/hole transport layer, and a structure of a single light-emitting layer. The OLED layer 44 may include an electron blocking layer and the like. Materials of the light-emitting layers are different according to the colors of the subpixels. The thicknesses of the hole injection layer, the hole transport layer, and the like may be individually determined according to the subpixels.

A manufacturer of the display device 10 may use an automated manufacturing apparatus which performs a series of manufacturing processes by automatically controlling the apparatuses of the manufacturing processes and the transport apparatus connecting the apparatuses. In this case, the determination and the performing in the steps described above are performed by a control device of the automated manufacturing apparatus.

Figure 12:
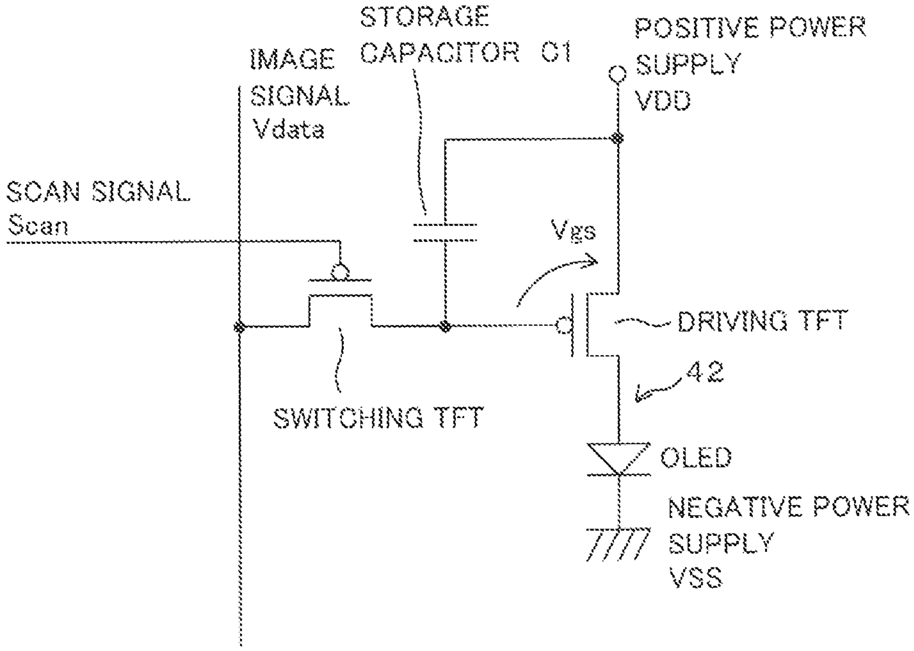
FIG. 12 is a circuit diagram illustrating a pixel circuit allowing one OLED to emit light.

An example of a pixel circuit allowing the subpixel to emit light will be described. In the description hereinafter, the light-emitting portion of one subpixel is referred to as an organic light emitting diode (OLED). FIG. 12 is a circuit diagram illustrating a pixel circuit allowing one OLED to emit light.

A positive power supply VDD, a negative power supply VSS, an image signal Vdata, and a scan signal Scan are input to the pixel circuit. The image signal Vdata is output from the demultiplexer 15. The scan signal Scan is output from the scan driver 16.

The pixel circuit includes a switching TFT, a driving TFT, and a storage capacitor C1 in addition to the OLED. The image signal Vdata is input to a source electrode of the switching TFT. The scan signal Scan is input to a gate electrode of the switching TFT. The positive power supply VDD is connected to the first electrode of the storage capacitor C1 and a source electrode of the driving TFT. The negative power supply VSS is connected to the cathode electrode 19 of the OLED. A drain electrode of the switching TFT is connected to the second electrode of the storage capacitor C1 and a gate electrode of the driving TFT. The drain electrode of the driving TFT is connected to the anode electrode 43 of the OLED through the TFT circuit output connection portion 42. A driving TFT is an example of a driving transistor that controls a current flowing to the organic light emitting element. A switching TFT is an example of a switch that controls electrical connection between the driving transistor and the organic light emitting element.

Figure 13:
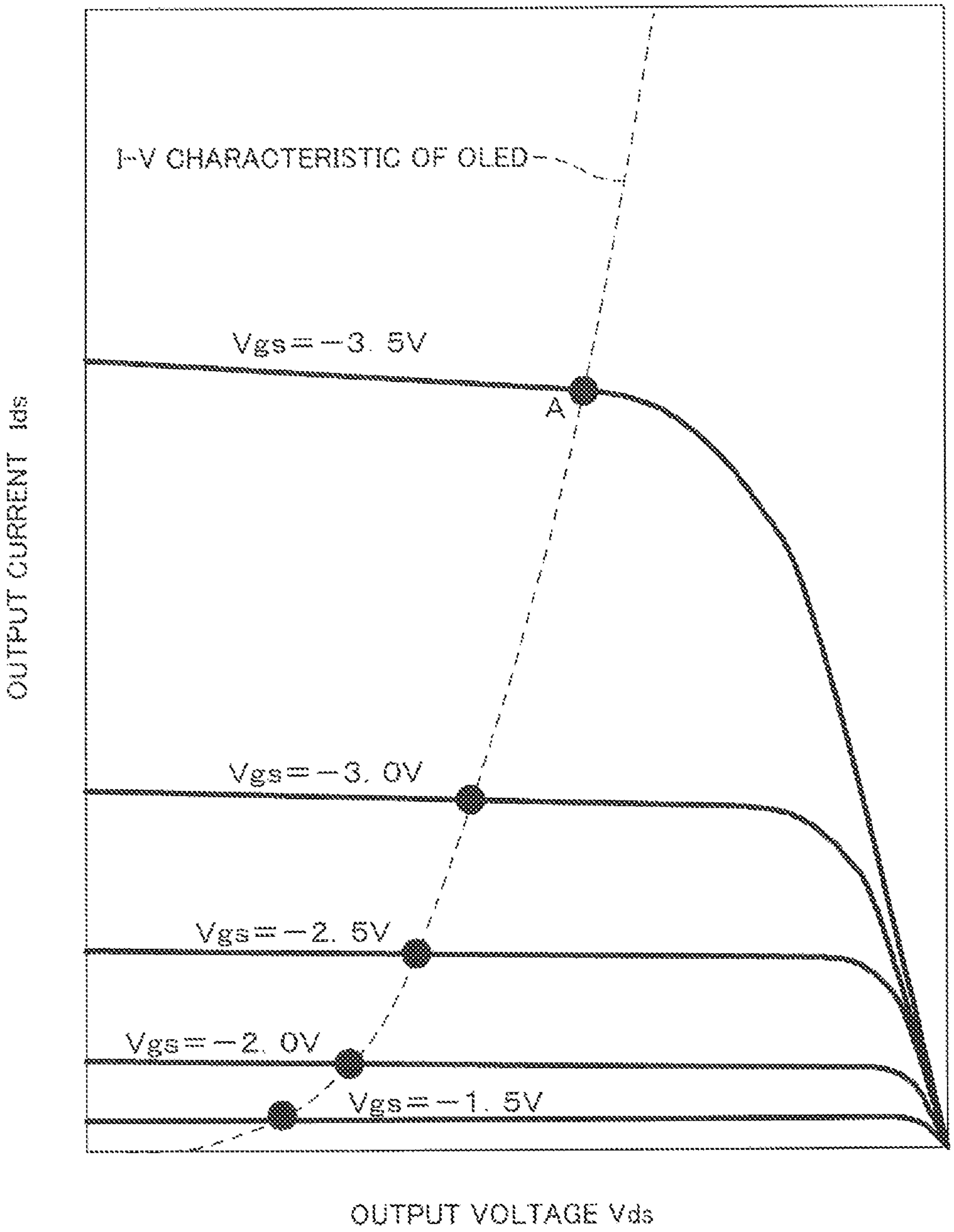
FIG. 13 is a diagram illustrating an output characteristic of a driving TFT.

FIG. 13 is a diagram illustrating an output characteristic of the driving TFT. The operations of the pixel circuit will be described with reference to FIGS. 12 and 13.

The horizontal axis of FIG. 13 denotes an output voltage Vds of the driving TFT. The vertical axis of FIG. 13 denotes an output current Ids of the driving TFT. In FIG. 13, each solid line indicates a relationship between the output voltage Vds and the output current Ids of the driving TFT in each of the cases where a potential difference Vgs between the gate electrode and the source electrode of the driving TFT is −1.5 V, −2.0 V, −2.5 V, −3.0 V, and −3.5 V. In FIG. 13, the broken line indicates an I-V characteristic that is a relationship of the current and voltage between the anode electrode 43 and the cathode electrode 19 of the OLED.

Figure 14:
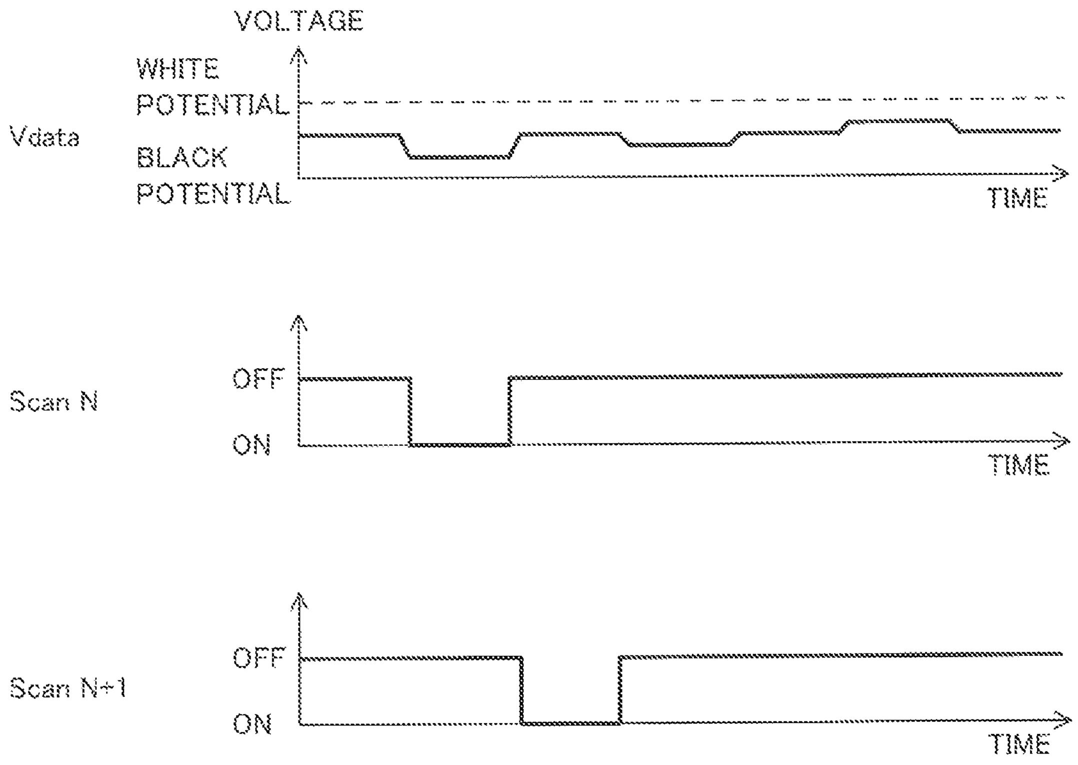
FIG. 14 is a time chart illustrating an image signal and driving signals.

FIG. 14 is a time chart illustrating an image signal and driving signals. The horizontal axes of FIG. 14 denote time. The vertical axes of FIG. 14 denote an image signal Vdata, a voltage of a scan signal Scan N of an N-th scan line, and a voltage of scan signal Scan N+1 of an (N+1)-th scan line. The image signal Vdata is the voltage between a black potential and a white potential corresponding to the brightness with which each OLED is allowed to emit light. The scan signal Scan N and the scan signal Scan N+1 are any one of ON and OFF. In FIG. 14, the scan signal Scan N is ON in the case of a low voltage and OFF in the case of a high voltage.

The operations of the OLED will be described with reference to FIGS. 12 to 14. The voltage of the scan signal Scan and the voltage of the image signal Vdata are applied to each pixel circuit. In a case where the scan line is selected by the scan driver 16, namely, in a case where the scan signal Scan is ON, the switching TFT becomes ON, and thus, the voltage according to the image signal Vdata is output from the drain electrode of the switching TFT.

According to the potential difference Vgs between the output voltage of the drain electrode of the switching TFT and the positive power supply VDD, the driving TFT is operated as illustrated in FIG. 13. That is, the lower the voltage Vgs is, the larger the current flowing in the OLED is. As a result, the OLED emits light with a high luminance. After the scan signal Scan becomes OFF, the potential difference Vgs of the driving TFT is maintained by charges stored in the storage capacitor C1, and the OLED continues to emit light.

Heretofore, an example in which a top-emission type OLED panel emitting light from the surface of the side opposite to the wiring portion 41 is used for the display device 10, described the manufacturing method, structure, and operations. A bottom-emission type OLED panel emitting light from the side of the wiring portion 41 may be used for the display device 10.

Next, the reason why the first color is blue, the second color is green, and the third color is red in the display device 10 according to the embodiment will be described. In general, among OLED materials of the three colors, that is, blue, green, and red, the material having the shortest life cycle is the OLED material of blue. Therefore, the life cycle of the display device 10 using the OLED panel is determined by the life cycle of the subpixel of blue. As described above, in order to increase the life cycle of the subpixel of the OLED panel, it is preferable that the light emitting portion is large.

In the arrangement of the subpixels illustrated in FIG. 4, the area of the first subpixel 31 is larger than the areas of the second subpixel 32 and the third subpixel 33. Therefore, the first color that is the color of the first subpixel 31 is set to blue, so that the life cycle of the display device 10 can be increased.

In a case where there is no need to increase the life cycle of the display device 10 and in a case where the OLED material of blue having a long life cycle can be used, the first color may be set to green or red.

Figure 15:
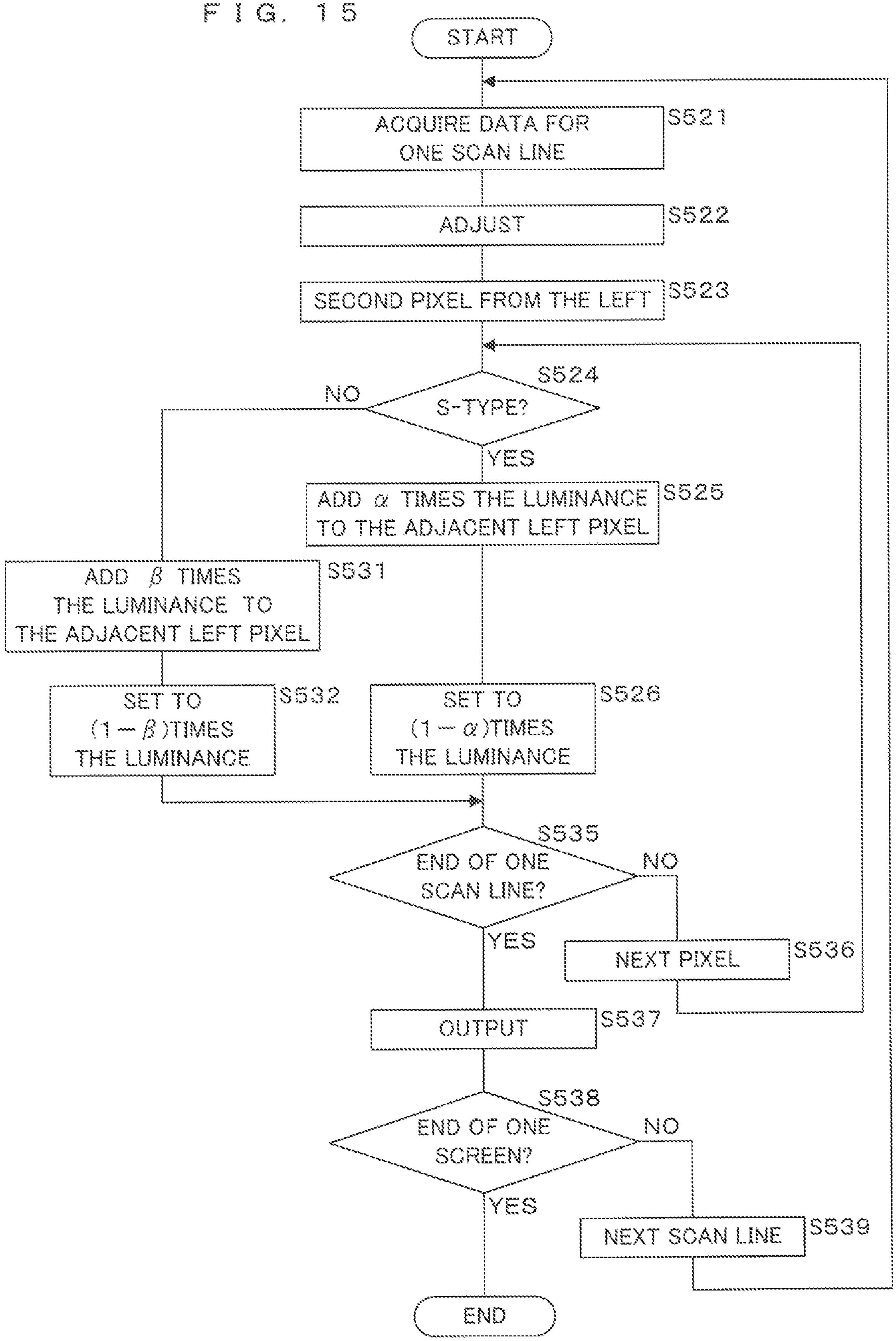
FIG. 15 is a flowchart illustrating a flow of processes of a program.

FIG. 15 is a flowchart illustrating a flow of processes of a program. The flow of the processes performed by the control unit 51 according to the embodiment illustrated in FIG. 3 will be described with reference to FIG. 15.

The control unit 51 acquires image data for one scan line through the FPC 12 (step S521). The control unit 51 adjusts the image data in accordance with the specification of the display device 10 (step S522). More specifically, the brightness adjustment unit 52 adjusts the brightness of the image. The color tone adjustment unit 53 adjusts the color tone of the image, such as color temperature. The gamma adjustment unit 54 performs gamma correction in accordance with a relationship between a magnitude of the image signal and a brightness of the screen in the display device 10. The control unit 51 stores the adjusted image data in the storage unit 56.

The luminance allocation unit 55 extracts the data of the second pixel from the left from the storage unit 56 (step S523). The luminance allocation unit 55 determines whether or not the pixel from which the data is extracted is the S-type pixel 351 (step S524).

In a case where it is determined that a processing pixel is the S-type pixel 351 (YES in step S524), the luminance allocation unit 55 adds the value of a times the luminance of the first subpixel 31 of the processing pixel to the luminance of the adjacent left pixel (step S525), the processing pixel is the pixel from which the data of the pixel is extracted (refer to step S523). The luminance allocation unit 55 set to $(1-\alpha)$ times the luminance of the first subpixel 31 of the processing pixel (step S526).

In a case where it is determined that the pixel is not the S-type pixel 351 (NO in step S524), the luminance allocation unit 55 adds the value of $\beta$ times the luminance of the first subpixel 31 of the processing pixel to the luminance of the adjacent left pixel (step S531). The luminance allocation unit 55 set to $(1-\beta)$ times the luminance of the first subpixel 31 of the processing pixel (step S532).

After step S526 or step S532, the luminance allocation unit 55 determines whether or not the scanning process for one scan line is ended (step S535). In a case where it is determined that the scanning process is not ended (NO in step S535), the luminance allocation unit 55 changes the target pixel to the next pixel, that is, the adjacent right pixel (step S536). The luminance allocation unit 55 returns to step S524. The target pixel is the pixel from which the data of the pixel will be extracted, next time.

In a case where it is determined that the process is ended (YES in step S535), the luminance allocation unit 55 outputs the data of the processed scan line to the emission control driver 14, the demultiplexer 15, and the scan driver 16 of the TFT substrate 11 (step S537). The subpixels corresponding to the processed scan lines of the display unit 30 emit light with predetermined luminances. In a case where, as a result of the process of the luminance allocation unit 55, the subpixel of which the luminance exceeds 100% is generated, the subpixel emits light with the luminance of 100%.

The control unit 51 determines whether or not all scanning processes for one screen are ended (step S538). In a case where it is determined that the scanning processes for one screen are not ended (NO in step S538), the control unit 51 changes the scan line which was scanned, to the next scan line (step S539). The control unit 51 returns to step S521.

In a case where it is determined that the process is ended (YES in step S538), the control unit 51 ends the process.

According to the embodiment, in the display device having the pixels where the arrangements of the subpixels are different, the color edge can be reduced. According to the embodiment, it is possible to provide the display device 10 capable of reducing the color edge by a simple process using the driver IC 18 having the storage unit 56 having a capacity of the image data for one scan line, that is, the line memory.

The arrangement and shapes of the first subpixel 31, the second subpixel 32, and the third subpixel 33 are not limited to FIG. 4. For example, the first subpixel 31 may be oval, rectangular, or the like. The second subpixel 32 and the third subpixel 33 may be rectangular, square, oval, circular, elliptic, hexagonal, octagonal, or the like. The second subpixel 32 and the third subpixel 33 may be different from each other in terms of size and shape. The preferred values of $\alpha$ and $\beta$ listed in Table 1 are determined by experiment, simulation, or the like according to shapes and sizes of the subpixels.

After the luminance allocation unit 55 performs the process, the gamma adjustment unit 54 performs the process to display the image on the display unit 30.

Second Embodiment

The embodiment relates to a display device 10 where, as a result of the process of the luminance allocation unit 55, in a case where there occurs a subpixel of which the luminance exceeds 100%, the luminance allocation is stopped. The portions common to the first embodiment will not be described.

Similarly to the display device 10 described in the first embodiment, the display device 10 according to the embodiment allocates a portion of the luminance of the first subpixel 31 to the first subpixel 31 of the adjacent left pixel. The value of the constant $\alpha$ defining the allocation ratio is 0.6, and the value of the constant $\beta$ is 0.4.

Figures 16A, 16B, 16C:
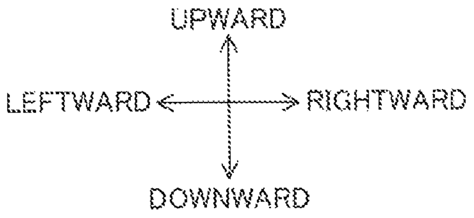
FIGS. 16A to 16C are diagrams illustrating luminance allocation according to a second embodiment.

FIGS. 16A to 16C are diagrams illustrating luminance allocation according to the second embodiment. FIGS. 16A to 16C are diagrams illustrating the luminances of the first subpixels 31 of a total of sixteen pixels of four rows and four columns as a percentage with respect to the maximum luminance.

FIG. 16A illustrates an example of the luminances of the first subpixels 31 determined based on the image signal. FIG. 16B illustrates a result of the allocation of the luminance of the first subpixel 31 to the first subpixel 31 in the adjacent left pixel based on the values of $\alpha$ and $\beta$ similarly to the first embodiment. The luminance of the first subpixel 31 of the second pixel from the left in the third row from the top exceeds 100% to be 114%. Actually, the luminance of the first subpixel 31 of which the luminance exceeds 100% may be set to 100%, and the decreased luminance of 14% may be returned to the adjacent right pixel. FIG. 16C illustrates an example where the luminance of the first subpixel 31 of which the luminance exceeds 100% is set to 100% and the decreased luminance of 14% is returned to the adjacent right pixel. The driver IC 18 according to the embodiment outputs the luminance illustrated in FIG. 16C.

Figure 17:
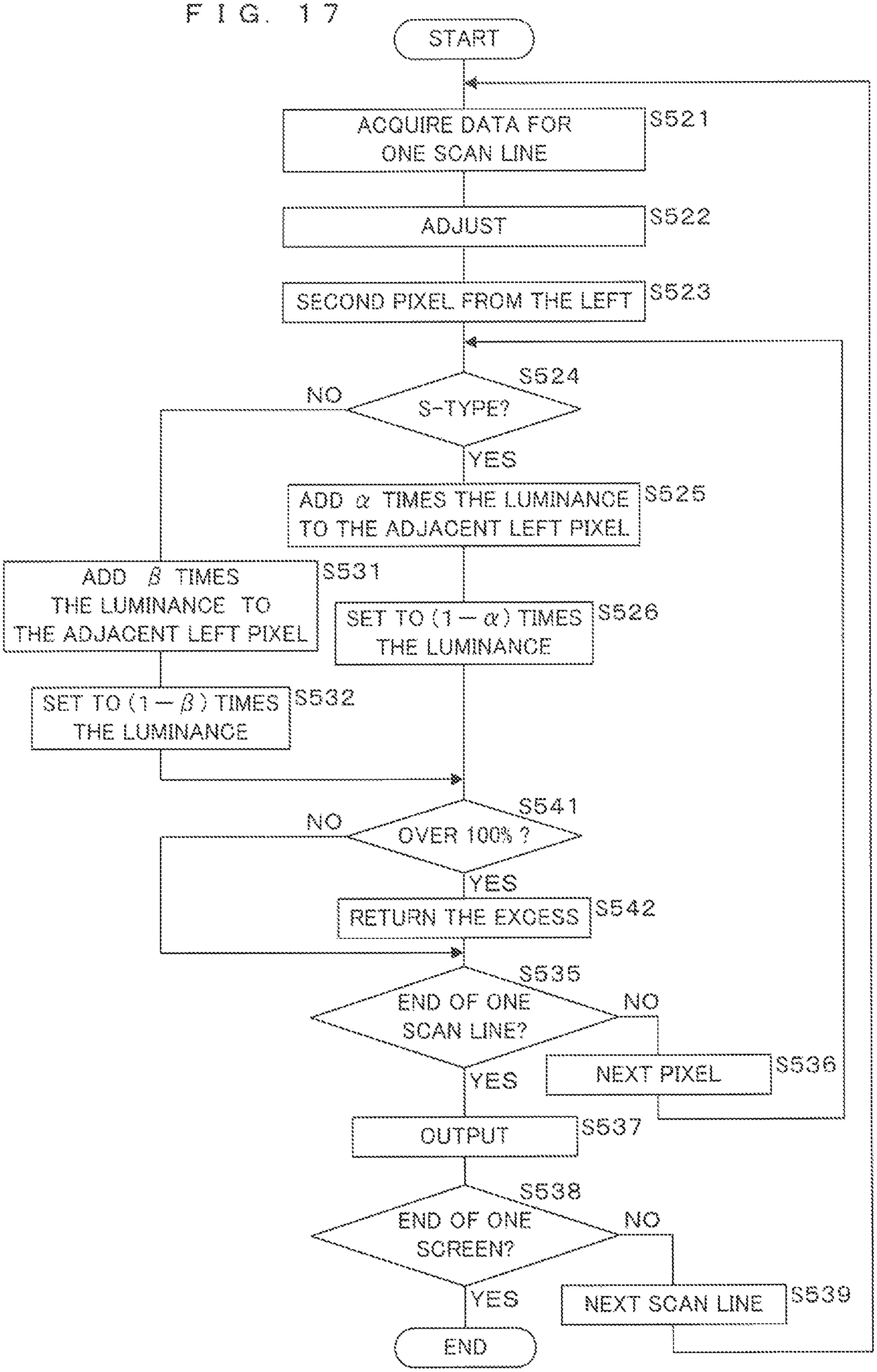
FIG. 17 is a flowchart illustrating a flow of processes of a program according to the second embodiment.

FIG. 17 is a flowchart illustrating a flow of processes of a program according to the second embodiment. The flow of the processes performed by the control unit 51 according to the embodiment will be described with reference to FIG. 17.

The processes up to step S532 are the same as those of FIG. 15, and thus, the description thereof is omitted. After step S526 or step S532, the luminance allocation unit 55 determines whether or not the luminance of the first subpixel 31 added with the luminance in step S525 or step S531 exceeds 100% (step S541).

In a case where it is determined that the luminance exceeds 100% (YES in step S541), the luminance allocation unit 55 returns the amount of the luminance exceeding 100% to the first subpixel 31 of the original pixel (step S542). More specifically, the difference between the luminance of the first subpixel 31 of the adjacent left pixel of the processing pixel and 100% is calculated, and the difference is added to the first subpixel 31 of the processing pixel. The luminance of the first subpixel 31 of the adjacent left pixel of the processing pixel is set to 100%.

In a case where it is determined that the luminance does not exceed 100% (NO in step S541) and after step S542 is ended, the luminance allocation unit 55 determines whether or not the process for one scan line is ended (step S535). The processes after step S535 are the same as those of the flowchart of the first embodiment described with reference to FIG. 15, and thus, the description thereof is omitted.

According to the embodiment, over the entire display unit 30, the sum of the luminances of the first subpixels 31 can be maintained to be the same as the sum of the luminances of the first subpixels 31 determined based on the image signal. Therefore, the brightness of the entire image can be close to the signal of the original image data.

Third Embodiment

The embodiment relates to a display device 10 where the luminance allocation unit 55 allocates the luminance of the first subpixel 31 to the first subpixels 31 of the two pixels that are the adjacent lower pixel and the adjacent slanted lower left pixel in the diagonal direction of the pixel. The portions common to the first embodiment will not be described.

Figure 18:
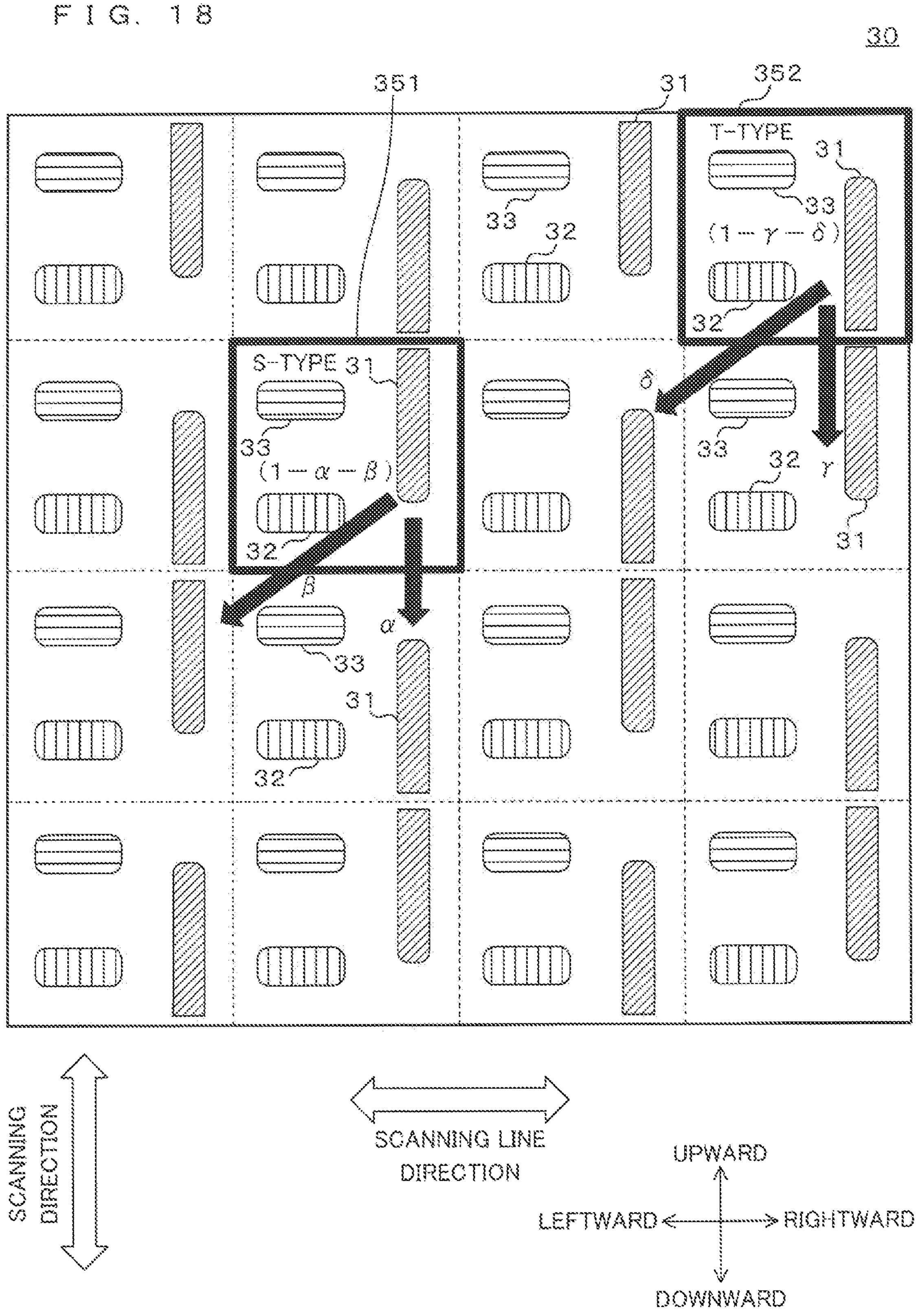
FIG. 18 is a diagram illustrating an arrangement of pixels and luminance allocation according to a third embodiment.

FIG. 18 is a diagram illustrating an arrangement of pixels and luminance allocation according to the third embodiment. In the embodiment, the luminance allocation unit 55 allocates a portion of the luminance of the first subpixel 31 to the first subpixels 31 of the two pixels that are the adjacent lower pixel and the adjacent slanted lower left pixel in the diagonal direction of the pixel as indicated by thick arrows in FIG. 18.

More specifically, the luminance allocation unit 55 adds α times the luminance of the first subpixel 31 of the S-type pixel 351 determined based on the image signal to the luminance of the first subpixel 31 of the adjacent lower pixel and adds β times the luminance of the first subpixel 31 of the S-type pixel 351 to the luminance of the first subpixel 31 of the adjacent lower left pixel. The luminance allocation unit 55 decreases the luminance of the first subpixel 31 of the original pixel by the aforementioned amount. Namely, the luminance of the first subpixel 31 of the original pixel becomes (1−α−β) times the luminance determined based on the image signal.

The luminance allocation unit 55 adds γ times the luminance of the first subpixel 31 of the T-type pixel 352 determined based on the image signal to the luminance of the first subpixel 31 of the adjacent lower pixel and adds δ times the luminance of the first subpixel 31 of the T-type pixel 352 to the luminance of the first subpixel 31 of the adjacent lower left pixel. The luminance allocation unit 55 decreases the luminance of the first subpixel 31 of the original pixel by the aforementioned amount. Namely, the luminance of the first subpixel 31 of the original pixel becomes (1−γ−δ) times the luminance determined based on the image signal.

Herein, α, β, γ, and δ are constants of 0 or more and 1 or less. The second subpixel 32 and the third subpixel 33 display the luminances determined based on the image signal as they are.

Figure 19A:
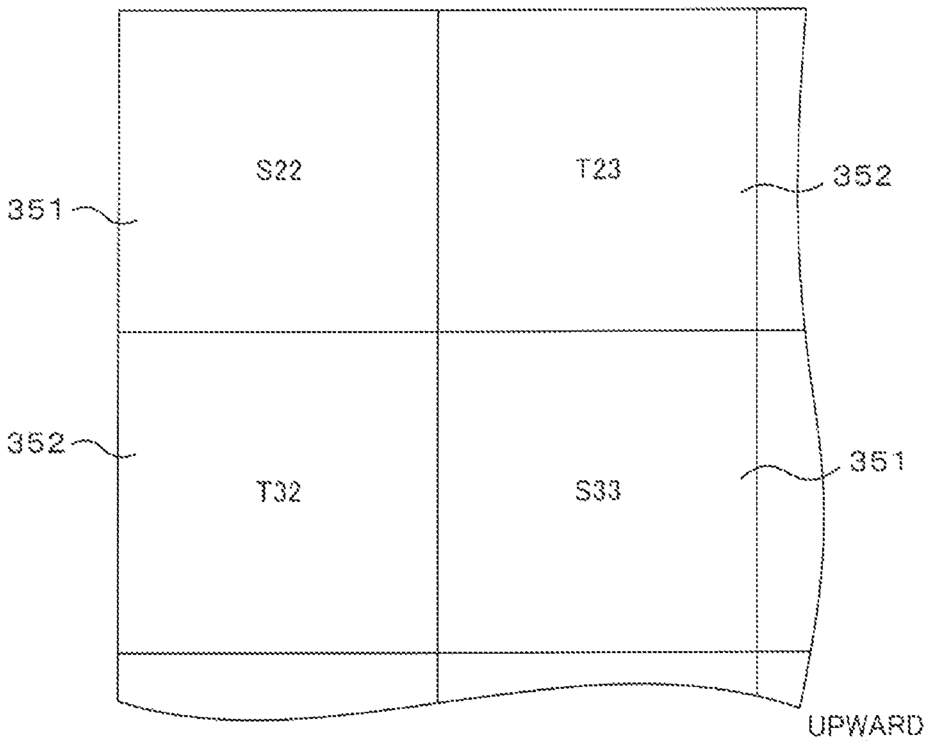
FIGS. 19A and 19B are diagrams illustrating luminance allocation according to the third embodiment.
Figure 19A:
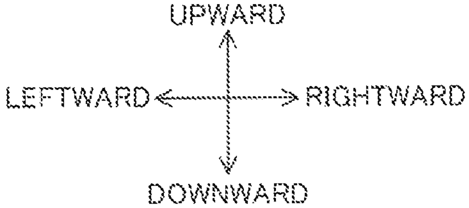
Figure 19B:
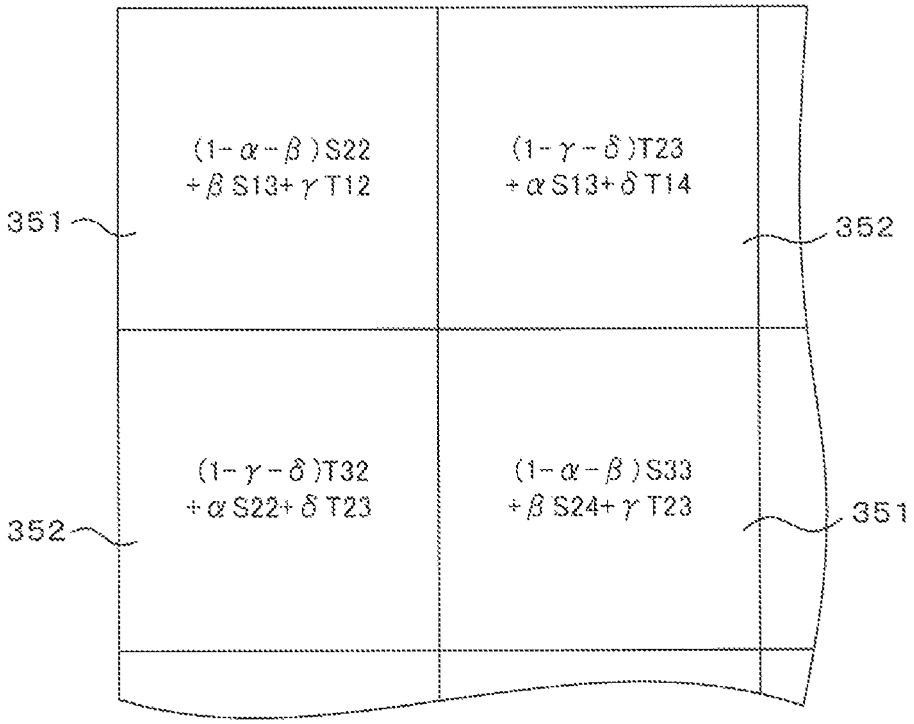

FIGS. 19A and 19B are diagrams illustrating luminance allocation according to the third embodiment. FIGS. 19A and 19B illustrate the luminances of the first subpixels 31 in the four pixels in the central portion of FIG. 18. FIG. 19A illustrates the luminances of the first subpixels 31 determined based on the image signal. The luminance of the first subpixel 31 of the S-type pixel 351 in the upper left portion of FIG. 19A is S22, the luminance of the first subpixel 31 of the T-type pixel 352 in the upper right portion is T23, the luminance of the first subpixel 31 of the T-type pixel 352 in the lower left portion is T32, and the luminance of the first subpixel 31 of the S-type pixel 351 in the lower right portion is S33.

FIG. 19B illustrates the luminances of the first subpixels 31 after the luminance allocation unit 55 performs the luminance allocation described with reference to FIG. 18. The luminance of the first subpixel 31 of the S-type pixel 351 in the upper left portion of FIG. 19B is (1−α−β) S22+β S13+γ T12. Herein, S13 and T12 indicate the luminances of the first subpixels 31 of the pixel in the one upper row from the pixel illustrated in FIGS. 19A and 19B.

Similarly, the luminance of the first subpixel 31 of the T-type pixel 352 in the upper right portion of FIG. 19B is (1−γ−δ) T23+α S13+δ T14. The luminance of the first subpixel 31 of the T-type pixel 352 in the lower left portion is (1−γ−6) T32+α S22+δ T23. The luminance of the first subpixel 31 of the S-type pixel 351 in the lower right portion is (1−α−β) S33+β S24+γ T23.

Examples of the combinations of the preferred α, β, γ, and δ that were found by the applicant of the disclosure through many studies are listed in Table 2. By using the combinations of the values of α, β, γ, and δ listed in Table 2, the color edge can be reduced so that the color edge is hardly conspicuous.

TABLE 2

| No. | α | β | γ | δ |
|---|---|---|---|---|
| 3-A | 0.1 | 0.2 | 0.05 | 0.15 |
| 3-B | 0.4 | 0.6 | 0.6 | 0.4 |
| 3-C | 0.2 | 0.0 | 0.1 | 0.0 |
| 3-D | 0.1 | 0.0 | 0.0 | 0.0 |
| 3-S | α | 0.0 | γ | 0.0 |

α, β, γ, and δ listed in Table 2 are the examples of the preferred values. In some cases, the preferred values of α, β, γ, and δ may be different from the values of Table 2 according to the arrangement of the subpixels or according to the image displayed on the display unit 30.

An example indicated by No. 3-B in Table 2 will be described more in detail. In the example of No. 3-B, since α is 0.4 and β is 0.6, the sum of α and β is 1.0. Therefore, 40% of the luminance of the first subpixel 31 of the S-type pixel 351 is allocated to the luminance of the first subpixel 31 of the adjacent lower pixel, and 60% thereof is allocated to the luminance of the first subpixel 31 of the adjacent lower left pixel. The luminance of the first subpixel of the original S-type pixel 351 becomes zero. Similarly, since γ is 0.6 and 6 is 0.4, the sum of γ and δ is 1.0. Therefore, 60% of the luminance of the first subpixel 31 of the T-type pixel 352 is allocated to the luminance of the first subpixel 31 of the adjacent lower pixel, and 40% thereof is allocated to the luminance of the first subpixel 31 of the adjacent lower left pixel. The luminance of the first subpixel 31 of the original T-type pixel 352 becomes zero.

An example indicated by No. 3-C in Table 2 will be described more in detail. In the example of No. 3-C, α is 0.2, and β is 0.0. Therefore, 20% of the luminance of the first subpixel 31 of the S-type pixel 351 is allocated to the luminance of the first subpixel 31 of the adjacent lower pixel and is not allocated to the luminance of the first subpixel 31 of the adjacent lower left pixel. Similarly, γ is 0.1, and δ is 0.0. Therefore, 10% of the luminance of the first subpixel 31 of the T-type pixel 352 is allocated to the luminance of the first subpixel 31 of the adjacent lower pixel and is not allocated to the luminance of the first subpixel 31 of the adjacent lower left pixel.

An example indicated by No. 3-D in Table 2 will be described more in detail. In the example of No. 3-D, α is 0.1, and β is 0.0. Therefore, 10% of the luminance of the first subpixel 31 of the S-type pixel 351 is allocated to the luminance of the first subpixel 31 of the adjacent lower pixel and is not allocated to the luminance of the first subpixel 31 of the adjacent lower left pixel. γ and δ are also 0.0. Therefore, the luminance of the first subpixel 31 of the T-type pixel 352 is not allocated to other pixels.

The flow of the processes according to the embodiment will be described by using the example indicated by No. 3-S in Table 2. For simplifying the description, in No. 3-S, β and δ indicating the luminance allocation to the adjacent slanted lower left pixel are set to zero.

Figure 20A:
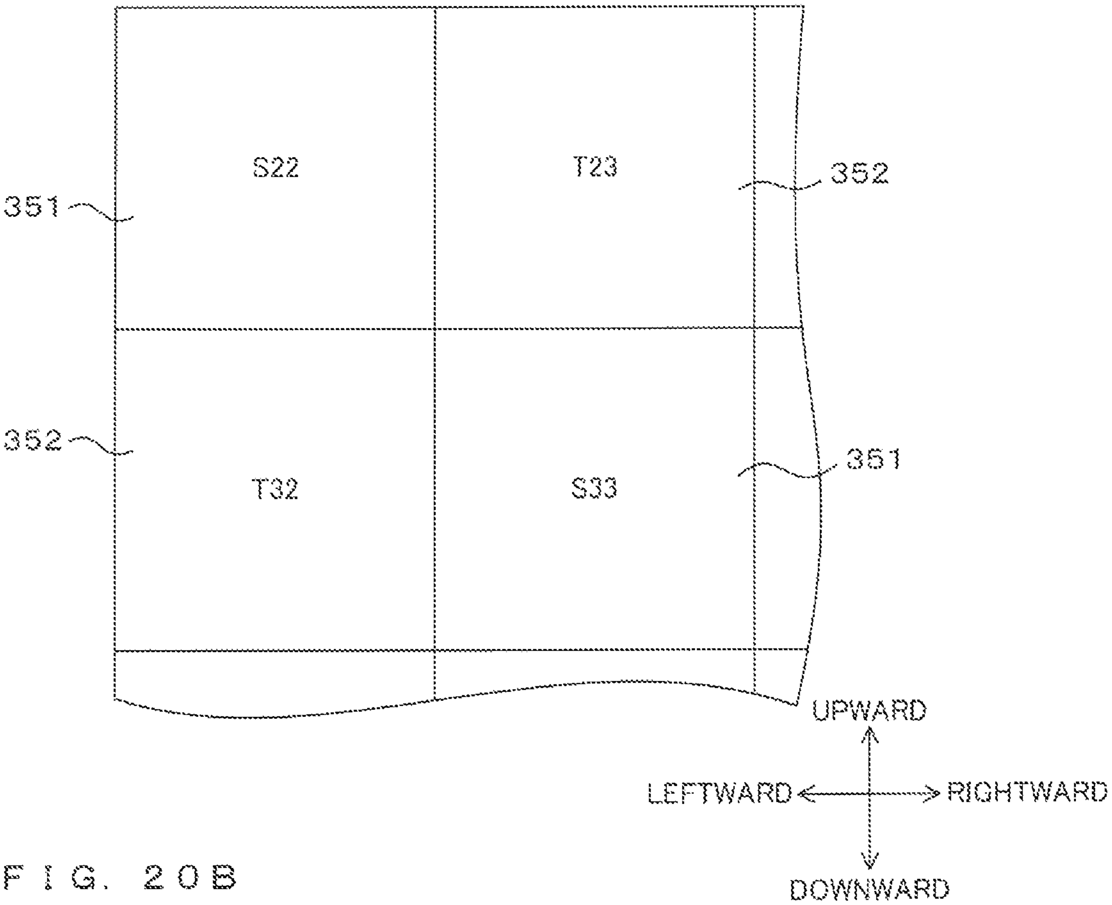
FIGS. 20A and 20B are diagrams illustrating luminance allocation of No. 3-S in Table 2.
Figure 20B:
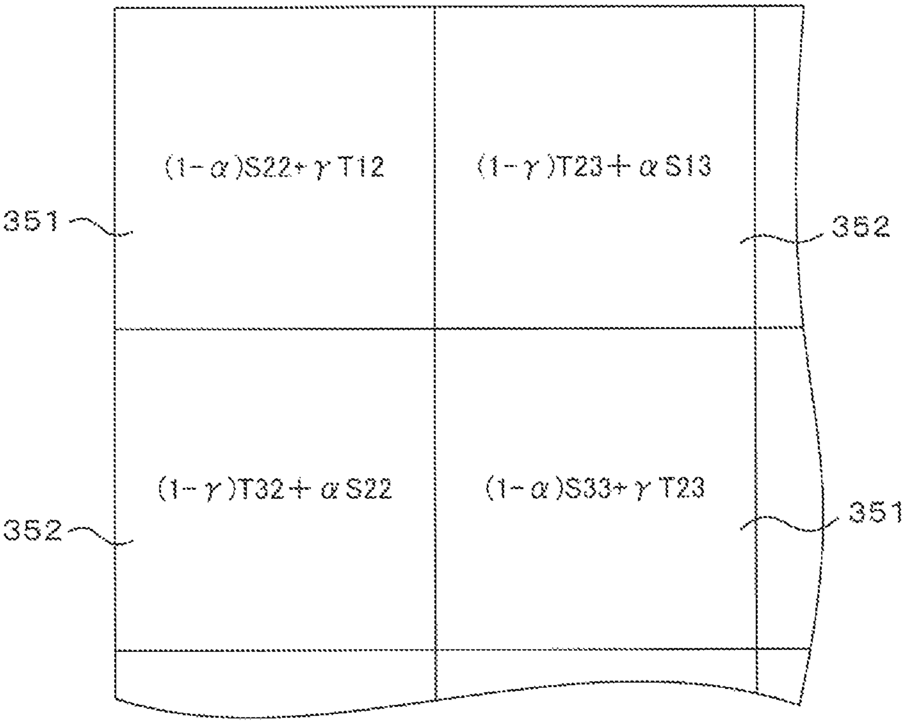
Figure 21:
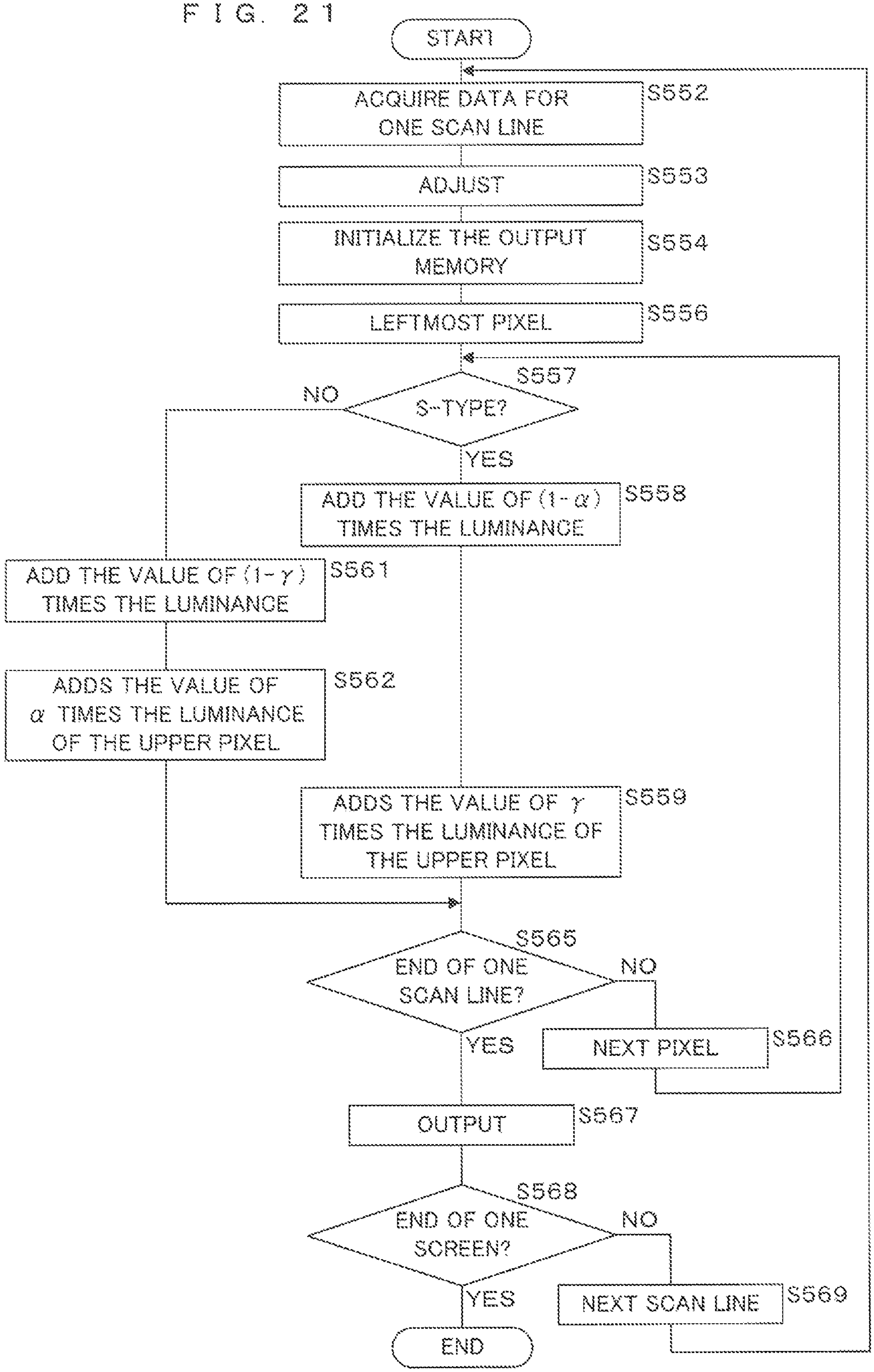
FIG. 21 is a flowchart illustrating a flow of processes of a program according to the third embodiment.

FIGS. 20A and 20B are diagrams illustrating luminance allocation of No. 3-S in Table 2. FIGS. 20A and 20B correspond to a case where β and δ of FIGS. 19A and 19B are set to zero. FIG. 21 is a flowchart illustrating a flow of processes of a program according to the third embodiment. More specifically, FIG. 21 is a flowchart at the time of implementing the luminance allocation illustrated in FIGS. 20A and 20B. The flow of the processes performed by the control unit 51 according to the embodiment will be described with reference to FIG. 21.

The control unit 51 acquires image data for one scan line through the FPC 12 (step S552). The control unit 51 adjusts the image data in accordance with the specification of the display device 10 (step S553). More specifically, the brightness adjustment unit 52 adjusts the brightness of the image. The color tone adjustment unit 53 adjusts the color tone of the image, such as color temperature. The gamma adjustment unit 54 performs gamma correction in accordance with a relationship between a magnitude of the image signal and a brightness of the screen in the display device 10.

The control unit 51 stores the adjusted image data in the storage unit 56. In the embodiment, data of the latest two scan lines are stored in the storage unit 56. Namely, the data of the older scan line between the data of the two scan lines stored in the storage unit 56 is removed, and the data of the scan line newly processed in step S553 is stored.

When the data of the first scan line is to be stored, data of a predefined dummy scan line is stored as data of one preceding scan line, that is, data of the zeroth scan line. As the data of the dummy scan line, for example, data where the luminances of all the subpixels are 50% is used.

The control unit 51 initializes the output memory storing the data of the output scan line (step S554). The output memory represents a portion of the storage area in the storage unit 56. A capacity of the storage area, that is, a capacity of the output memory is a capacity of data for one scan line. As an initial value used in step S554, the data where the luminances of all the subpixels are zero is used.

The luminance allocation unit 55 extracts the data of the leftmost pixel from the storage unit 56 (step S556). The luminance allocation unit 55 determines whether or not the pixel from which the data is extracted is the S-type pixel 351 (step S557).

In a case where it is determined that the pixel is the S-type pixel 351 (YES in step S557), the luminance allocation unit 55 adds the value of (1−α) times the luminance of the first subpixel 31 of the processing pixel to the luminance of the pixel corresponding to the output memory (step S558). The luminance allocation unit 55 adds the value of γ times the luminance of the first subpixel 31 of the one upper pixel from the processing pixel to the luminance of the pixel corresponding to the output memory (step S559).

In a case where it is determined that the pixel is not the S-type pixel 351 (NO in step S557), the luminance allocation unit 55 adds the value of (1−γ) times the luminance of the first subpixel 31 of the processing pixel to the luminance of the pixel corresponding to the output memory (step S561). The luminance allocation unit 55 adds the value of a times the luminance of the first subpixel 31 of the one upper pixel from the processing pixel to the luminance of the pixel corresponding to the output memory (step S562).

After step S559 or step S562 is ended, the luminance allocation unit 55 determines whether or not the process for one scan line is ended (step S565). In a case where it is determined that the process is not ended (NO in step S565), the luminance allocation unit 55 changes the target pixel to the next pixel, that is, the adjacent right pixel (step S566). The luminance allocation unit 55 returns to step S557.

In a case where it is determined that the process is ended (YES in step S565), the luminance allocation unit 55 outputs the data stored in the output memory to the emission control driver 14, the demultiplexer 15, and the scan driver 16 of the TFT substrate 11 (step S567). The subpixels corresponding to the processed scan lines of the display unit 30 emit light with predetermined luminances. In a case where, as a result of the process of the luminance allocation unit 55, the subpixel of which the luminance exceeds 100% is generated, the subpixel emits light with the luminance of 100%.

The control unit 51 determines whether or not the process for one screen is ended (step S568). In a case where it is determined that the process is not ended (NO in step S568), the control unit 51 changes the to-be-processed scan line to the next scan line (step S569). The control unit 51 returns to step S552.

In a case where it is determined that the process is ended (YES in step S568), the control unit 51 ends the process.

According to the embodiment, it is possible to provide the display device 10 capable of reducing the color edge by a simple process using a driver IC 18 having the storage unit 56 having a capacity of the image data for two scan lines, that is, the line memory for two scan lines.

According to the embodiment, as described with reference to FIG. 18, the luminance of the first subpixel 31 is allocated to the luminances of the two first subpixels 31 adjacent to the subpixel. Namely, according to the embodiment, the luminance of the first subpixel 31 is adjusted finely. Due to the fine adjustment of the luminance, the color edge can be further reduced. The settings of the values of α, β, γ, and δ used by the luminance allocation unit 55 are allowed to be changeable from an external side, it is possible to provide the driver IC 18 capable of reducing the color edge of the display panel having various characteristics.

Fourth Embodiment

The embodiment relates to a display device 10 where the scan line direction is determined according to the operation of the luminance allocation unit 55, so that a capacity of the storage unit 56 is saved. The portions common to the third embodiment will not be described.

Figure 22:
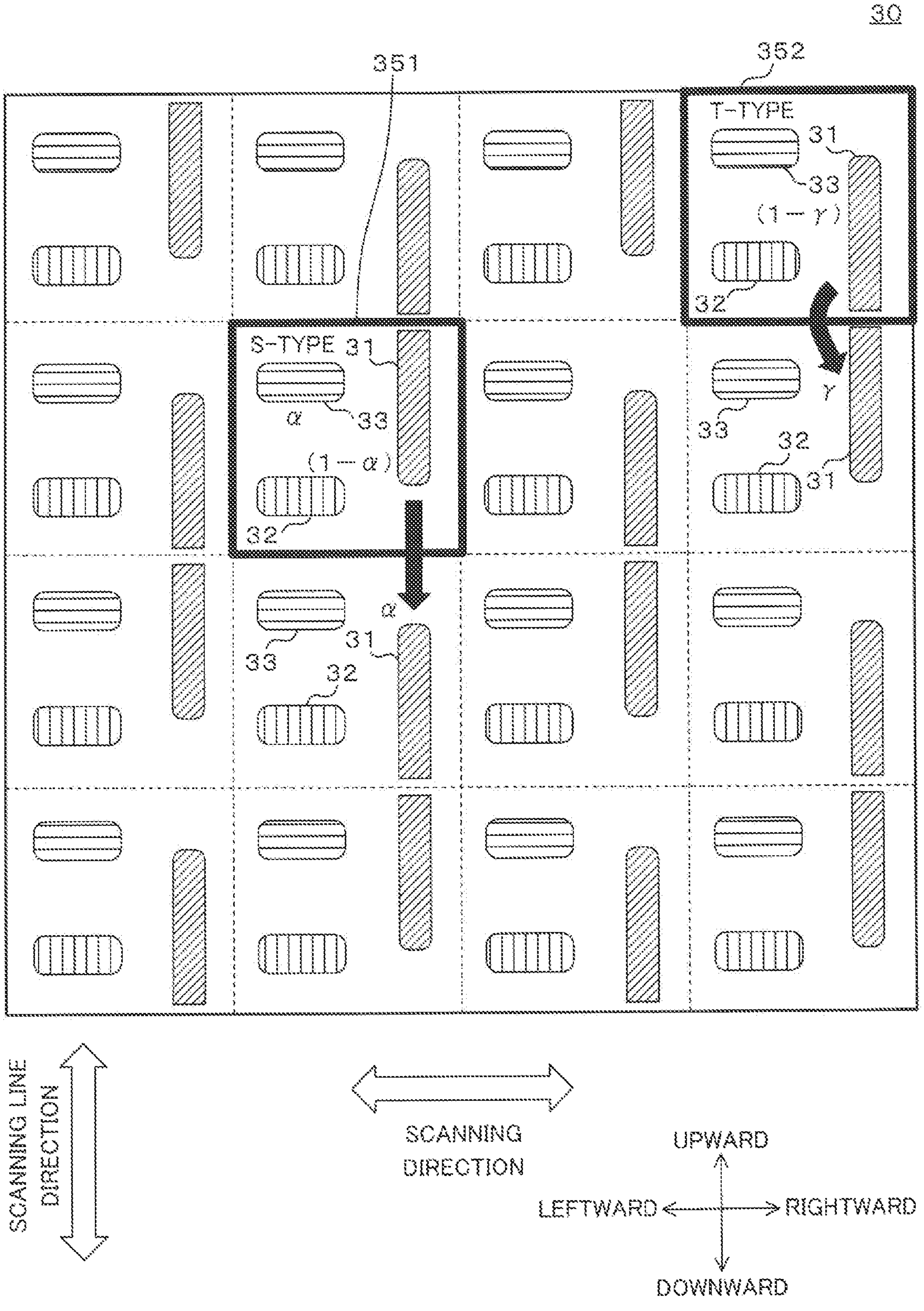
FIG. 22 is a diagram illustrating an arrangement of pixels and luminance allocation according to a fourth embodiment.

FIG. 22 is a diagram illustrating an arrangement of pixels and luminance allocation according to the fourth embodiment. The operations of the luminance allocation unit 55 are the same as those of No. 3-S in Table 2. Namely, the luminance allocation unit 55 performs luminance allocation on the first subpixel 31 of the adjacent lower pixel.

In the embodiment, the scan line direction is the upward/downward direction. By moving the scan line in the leftward/rightward direction, an image is displayed on the display unit 30. The demultiplexer 15 is arranged at the left or right side of the TFT substrate 11, and the scan driver 16 is arranged at the upper or lower side of the TFT substrate 11, so that the wiring in TFT substrate 11 according to the embodiment can be simplified.

According to the embodiment, the luminance allocation unit 55 allocates the luminance to the pixels in the same scan line. For this reason, the data for one scan line is stored in the storage unit 56 to perform the process, so that the color edge can be reduced. Therefore, it is possible to provide the display device 10 capable of reducing the color edge using the driver IC 18 including the storage unit 56 having a small capacity, that is, an inexpensive driver IC 18.

Fifth Embodiment

The embodiment relates to a display device 10 where the luminance allocation unit 55 allocates the luminance of the first subpixel 31 to the first subpixels 31 of the two pixels that are the adjacent lower pixel and the adjacent left pixels. The portions common to the third embodiment will not be described.

Figure 23:
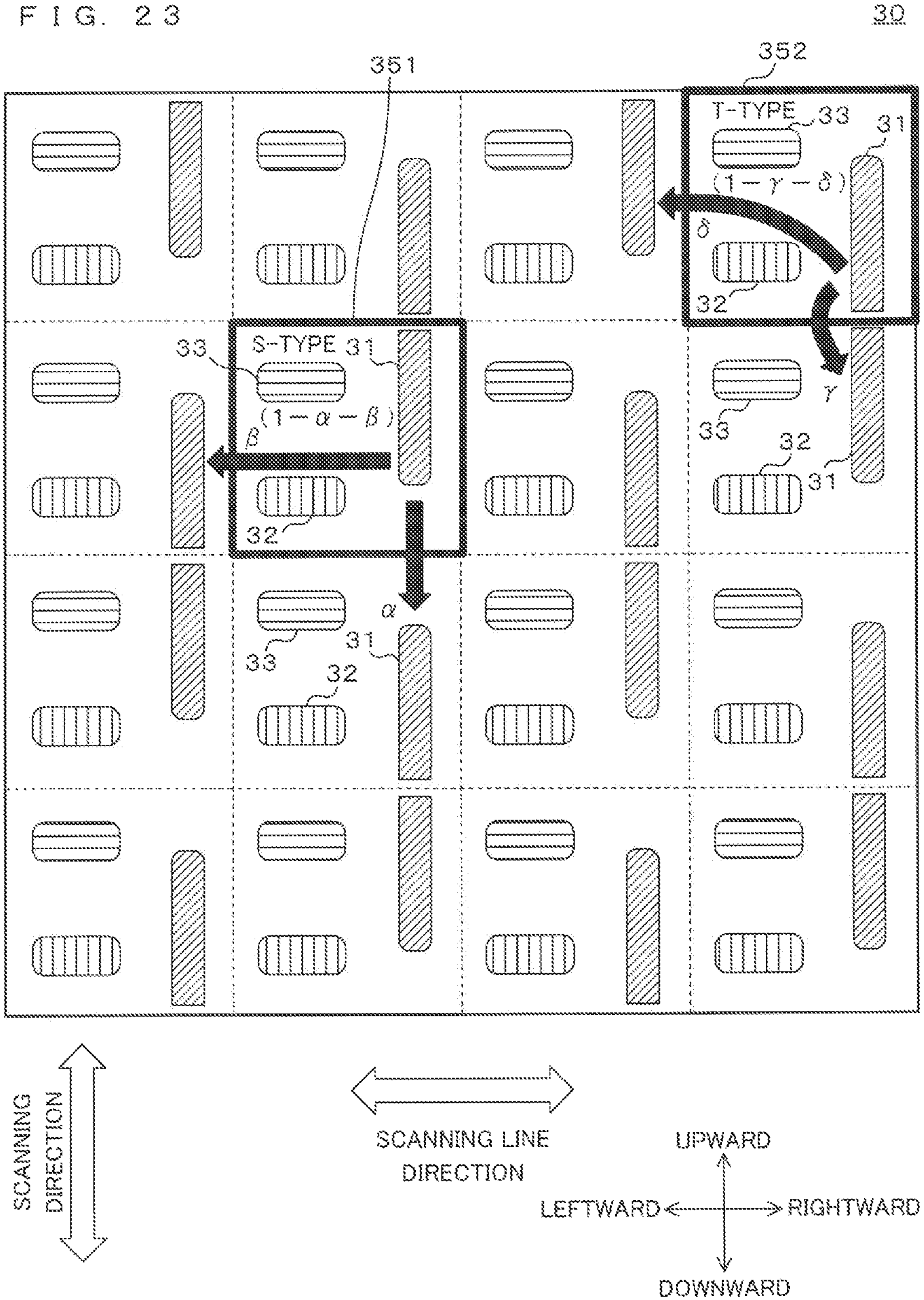
FIG. 23 is a diagram illustrating an arrangement of pixels and luminance allocation according to a fifth embodiment.

FIG. 23 is a diagram illustrating an arrangement of pixels and luminance allocation according to the fifth embodiment. In the embodiment, the luminance allocation unit 55 allocates a portion of the luminance of the first subpixel 31 to the first subpixels 31 of the two pixels that are the adjacent lower pixels and the adjacent left pixel as indicated by thick arrows in FIG. 23.

More specifically, the luminance allocation unit 55 adds $\alpha$ times the luminance of the first subpixel 31 of the S-type pixel 351 determined based on the image signal to the luminance of the first subpixel 31 of the adjacent lower pixel and adds $\beta$ times the luminance of the first subpixel 31 of the S-type pixel 351 to the luminance of the first subpixel 31 of the adjacent left pixel. The luminance allocation unit 55 decreases the luminance of the first subpixel 31 of the original pixel by the aforementioned amount. Namely, the luminance of the first subpixel 31 of the original pixel becomes $(1-\alpha-\beta)$ times the luminance determined based on the image signal.

The luminance allocation unit 55 adds $\gamma$ times the luminance of the first subpixel 31 of the T-type pixel 352 determined based on the image signal to the luminance of the first subpixel 31 of the adjacent lower pixel and adds $\delta$ times the luminance of the first subpixel 31 of the T-type pixel 352 to the luminance of the first subpixel 31 of the adjacent left pixel. The luminance allocation unit 55 decreases the luminance of the first subpixel 31 of the original pixel by the aforementioned amount. Namely, the luminance of the first subpixel 31 of the original pixel becomes $(1-\gamma-\delta)$ times the luminance determined based on the image signal.

Herein, $\alpha$, $\beta$, $\gamma$, and $\delta$ are constants of 0 or more and 1 or less. The second subpixel 32 and the third subpixel 33 display the luminances determined based on the image signal as they are.

According to the embodiment, it is possible to provide the display device 10 capable of reducing the color edge by a simple process using the driver IC 18 having the storage unit 56 having a capacity of the image data for two scan lines, that is, the line memory for two scan lines.

Sixth Embodiment

The embodiment relates to a display device 10 where the luminance allocation unit 55 allocates the luminance of the first subpixel 31 and the luminance of the second subpixel 32 to the first subpixel 31 and the second subpixel 32 of the adjacent lower pixel, respectively. The portions common to the fourth embodiment will not be described.

Figure 24:
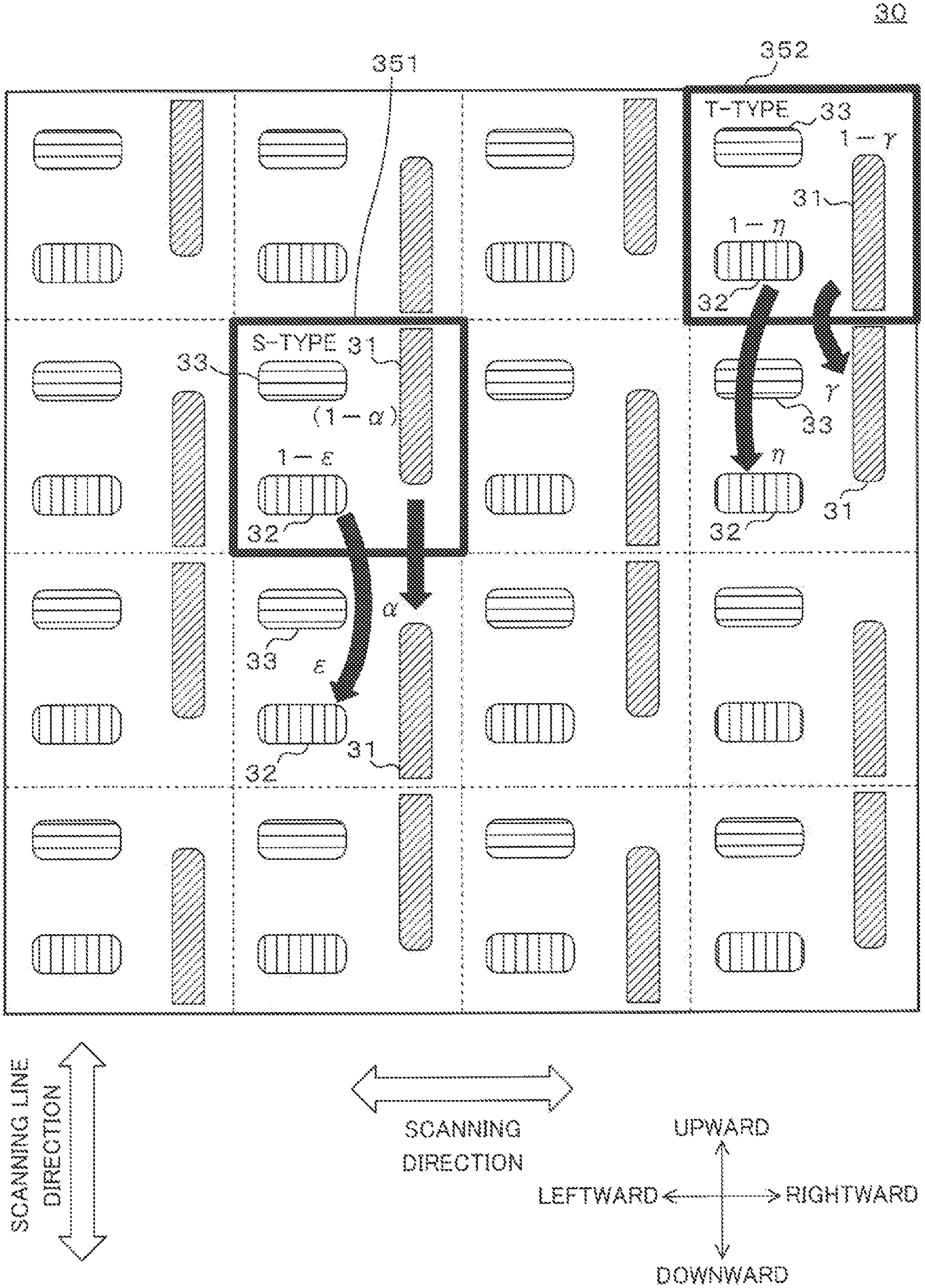
FIG. 24 is a diagram illustrating an arrangement of pixels and luminance allocation according to a sixth embodiment.

FIG. 24 is a diagram illustrating an arrangement of pixels and luminance allocation according to the sixth embodiment. In the embodiment, the luminance allocation unit 55 allocates a portion of the luminance of the first subpixel 31 to the first subpixel 31 of the adjacent lower pixel as indicated by thick arrows in FIG. 24. The luminance allocation unit 55 allocates a portion of the luminance of the second subpixel 32 to the second subpixel 32 of the adjacent lower pixel.

More specifically, the luminance allocation unit 55 adds $\alpha$ times the luminance of the first subpixel 31 of the S-type pixel 351 determined based on the image signal to the luminance of the first subpixel 31 of the adjacent lower pixel. The luminance allocation unit 55 decreases the luminance of the first subpixel 31 of the original pixel by the aforementioned amount. Namely, the luminance of the first subpixel 31 of the original pixel becomes $(1-\alpha)$ times the luminance determined based on the image signal.

The luminance allocation unit 55 adds $\varepsilon$ times the luminance of the second subpixel 32 of the S-type pixel 351 determined based on the image signal to the luminance of the second subpixel 32 of the adjacent lower pixel. The luminance allocation unit 55 decreases the luminance of the second subpixel 32 of the original pixel by the aforementioned amount. Namely, the luminance of the second subpixel 32 of the original pixel becomes $(1-\varepsilon)$ times the luminance determined based on the image signal.

The luminance allocation unit 55 adds $\gamma$ times the luminance of the first subpixel 31 of the T-type pixel 352 determined based on the image signal to the luminance of the first subpixel 31 of the adjacent lower pixel. The luminance allocation unit 55 decreases the luminance of the first subpixel 31 of the original pixel by the aforementioned amount. Namely, the luminance of the first subpixel 31 of the original pixel becomes $(1-\gamma)$ times the luminance determined based on the image signal.

The luminance allocation unit 55 adds $\eta$ times the luminance of the second subpixel 32 of the T-type pixel 352 determined based on the image signal to the luminance of the second subpixel 32 of the adjacent lower pixel. The luminance allocation unit 55 decreases the luminance of the second subpixel 32 of the original pixel by the aforementioned amount. Namely, the luminance of the second subpixel 32 of the original pixel becomes (1−η) times the luminance determined based on the image signal.

Herein, α, γ, ε, and η are constants of 0 or more and 1 or less. The third subpixel 33 displays the luminance determined based on the image signal as it is.

Examples of the combinations of the preferred α, γ, ε, and η that were found by the applicant of the disclosure through many studies are listed in Table 3. By using the combinations of the values of α, γ, ε, and η listed in Table 3, the color edge can be reduced so that the color edge is hardly conspicuous.

TABLE 3

| No. | α | γ | ε | η |
|---|---|---|---|---|
| 6-A | 0.1 | 0.0 | 0.0 | 0.1 |
| 6-B | 0.2 | 0.1 | 0.1 | 0.3 |

An example indicated by No. 6-A in Table 3 will be described more in detail. In the example of No. 6-A, α is 0.1, and ε is 0.0. Therefore, with respect to the S-type pixel 351, 10% as a portion of the luminance of the first subpixel 31 is allocated to the luminance of the first subpixel 31 of the adjacent lower pixel. The luminance allocation of the second subpixel 32 is not performed. γ is 0.0, and η is 0.1. Therefore, with respect to the T-type pixel 352, 10% as a portion of the luminance of the second subpixel 32 is allocated to the luminance of the second subpixel 32 of the adjacent lower pixel. The luminance allocation of the first subpixel 31 is not performed.

An example indicated by No. 6-B in Table 3 will be described more in detail. In the example of No. 6-B, α is 0.2, and ε is 0.1. Therefore, with respect to the S-type pixel 351, 20% as a portion the luminance of the first subpixel 31 is allocated to the luminance of the first subpixel 31 of the adjacent lower pixel. 10% as a portion of the luminance of the second subpixel 32 is allocated to the luminance of the second subpixel 32 of the adjacent lower pixel. γ is 0.1, and η is 0.3. Therefore, with respect to the T-type pixel 352, 10% as a portion of the luminance of the first subpixel 31 is allocated to the luminance of the first subpixel 31 of the adjacent lower pixel. 30% as a portion of the luminance of the second subpixel 32 is allocated to the luminance of the second subpixel 32 of the adjacent lower pixel.

α, γ, ε, and η listed in Table 3 are the examples of the preferred values. In some cases, the preferred values of α, γ, ε, and η may be different from the values of Table 3 according to the arrangement of the subpixels or according to the image displayed on the display unit 30.

In the embodiment, similarly to the fourth embodiment, the scan line direction is the upward/downward direction. By moving the scan line in the leftward/rightward direction, an image is displayed on the display unit 30. Therefore, the luminance allocation unit 55 performs the luminance allocation between the subpixels included in one scan line.

According to the embodiment, since the luminance allocation of the subpixels of the two colors that is the first color and the second color is performed, the color edge can be further reduced. According to the embodiment, the luminance allocation unit 55 allocates the luminance to the pixels in the same scan line. For this reason, the data for one scan line is stored in the storage unit 56 to perform the process, so that the color edge can be reduced. Therefore, it is possible to provide the display device 10 capable of reducing the color edge using the driver IC 18 including the storage unit 56 having a small capacity, that is, an inexpensive driver IC 18.

The luminance allocation unit 55 may allocate the luminance of the first subpixel 31 and the luminance of the second subpixel 32 to the first subpixel 31 and the second subpixel 32 of the two pixels, for example, the adjacent lower pixel and the adjacent right pixel, respectively.

Seventh Embodiment

The embodiment relates to a display device 10 where the luminance allocation unit 55 allocates the luminance of the first subpixel 31, the luminance of the second subpixel 32, and the luminance of the third subpixel 33 to the first subpixel 31, the second subpixel 32, and the third subpixel 33 of the adjacent lower pixel, respectively. The portions common to the fourth embodiment will not be described.

Figure 25:
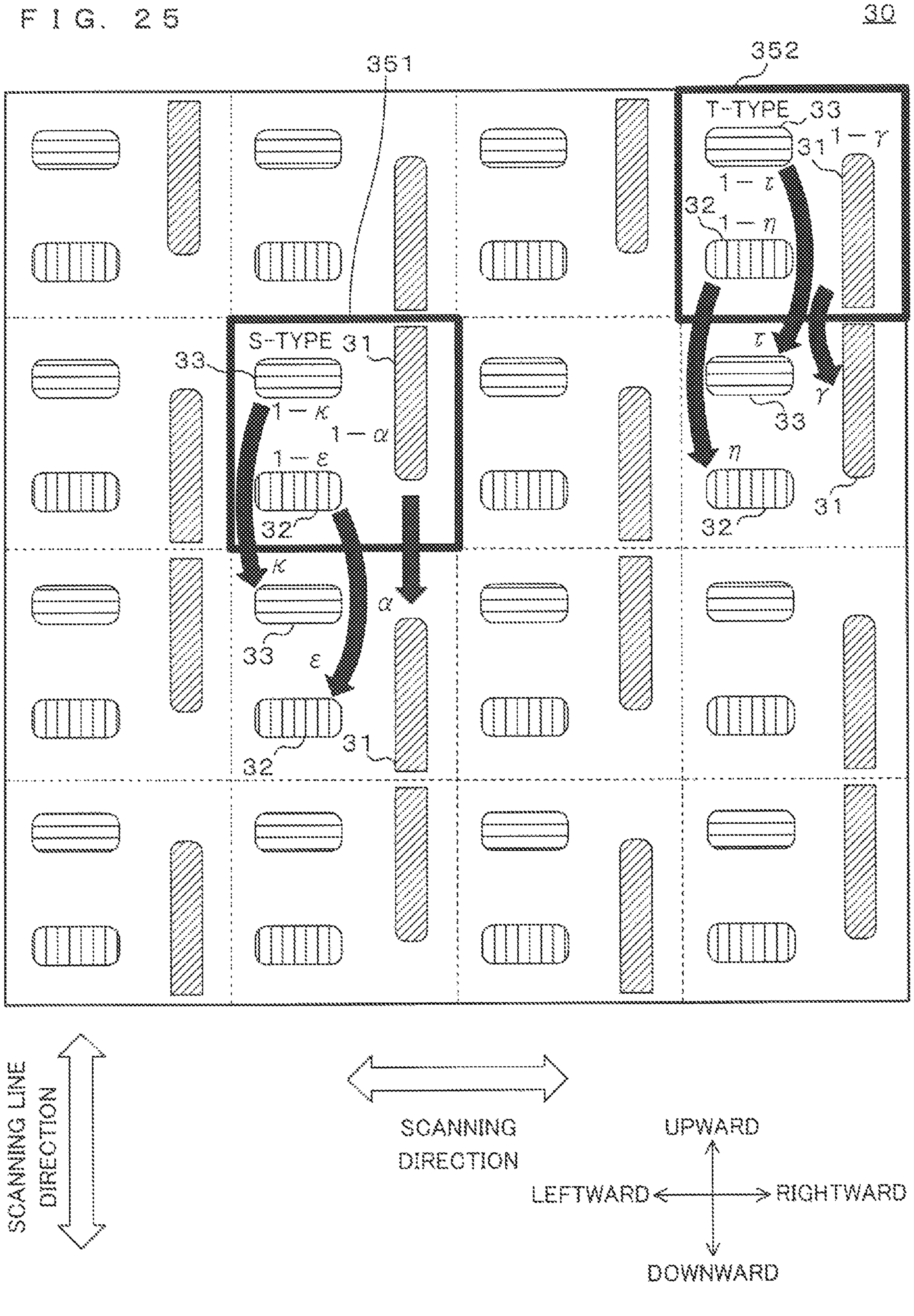
FIG. 25 is a diagram illustrating an arrangement of pixels and luminance allocation according to a seventh embodiment.

FIG. 25 is a diagram illustrating an arrangement of pixels and luminance allocation according to the seventh embodiment. In the embodiment, the luminance allocation unit 55 allocates a portion of the luminance of the first subpixel 31 to the first subpixel 31 of the adjacent lower pixel as indicated by thick arrows in FIG. 25. The luminance allocation unit 55 allocates a portion of the luminance of the second subpixel 32 of the T-type pixel 352 to the second subpixel 32 of the adjacent lower pixel. The luminance allocation unit 55 allocates a portion of the luminance of the third subpixel 33 of the S-type pixel 351 to the third subpixel 33 of the adjacent lower pixel.

More specifically, the luminance allocation unit 55 adds α times the luminance of the first subpixel 31 of the S-type pixel 351 determined based on the image signal to the luminance of the first subpixel 31 of the adjacent lower pixel. The luminance allocation unit 55 decreases the luminance of the first subpixel 31 of the original pixel by the aforementioned amount. Namely, the luminance of the first subpixel 31 of the original pixel becomes (1−α) times the luminance determined based on the image signal.

The luminance allocation unit 55 adds ε times the luminance of the second subpixel 32 of the S-type pixel 351 determined based on the image signal to the luminance of the second subpixel 32 of the adjacent lower pixel. The luminance allocation unit 55 decreases the luminance of the second subpixel 32 of the original pixel by the aforementioned amount. Namely, the luminance of the second subpixel 32 of the original pixel becomes (1−ε) times the luminance determined based on the image signal.

The luminance allocation unit 55 adds κ times the luminance of the third subpixel 33 of the S-type pixel 351 determined based on the image signal to the luminance of the third subpixel 33 of the adjacent lower pixel. The luminance allocation unit 55 decreases the luminance of the third subpixel 33 of the original pixel by the aforementioned amount. Namely, the luminance of the third subpixel 33 of the original pixel becomes (1−κ) times the luminance determined based on the image signal.

The luminance allocation unit 55 adds γ times the luminance of the first subpixel 31 of the T-type pixel 352 determined based on the image signal to the luminance of the first subpixel 31 of the adjacent lower pixel. The luminance allocation unit 55 decreases the luminance of the first subpixel 31 of the original pixel by the aforementioned amount. Namely, the luminance of the first subpixel 31 of the original pixel becomes (1−γ) times the luminance determined based on the image signal.

The luminance allocation unit 55 adds η times the luminance of the second subpixel 32 of the T-type pixel 352 determined based on the image signal to the luminance of the second subpixel 32 of the adjacent lower pixel. The luminance allocation unit 55 decreases the luminance of the second subpixel 32 of the original pixel by the aforementioned amount. Namely, the luminance of the second subpixel 32 of the original pixel becomes (1−η) times the luminance determined based on the image signal.

The luminance allocation unit 55 adds τ times the luminance of the third subpixel 33 of the T-type pixel 352 determined based on the image signal to the luminance of the third subpixel 33 of the adjacent lower pixel. The luminance allocation unit 55 decreases the luminance of the third subpixel 33 of the original pixel by the aforementioned amount. Namely, the luminance of the third subpixel 33 of the original pixel becomes (1−τ) times the luminance determined based on the image signal.

Herein, α, γ, ε, η, κ, and τ are constants of 0 or more and 1 or less.

In the embodiment, similarly to the sixth embodiment, the scan line direction is the upward/downward direction. By moving the scan line in the leftward/rightward direction, an image is displayed on the display unit 30. Therefore, the luminance allocation unit 55 performs the luminance allocation between the subpixels included in one scan line.

According to the embodiment, since the luminance allocation of the subpixels of the three colors that is the first color, second color, and the third color is performed, the color edge can be further reduced. According to the embodiment, the luminance allocation unit 55 allocates the luminance to the pixels in the same scan line. For this reason, the data for one scan line is stored in the storage unit 56 to perform the process, so that the color edge can be reduced. Therefore, it is possible to provide the display device 10 capable of reducing the color edge using the driver IC 18 including the storage unit 56 having a small capacity, that is, an inexpensive driver IC 18.

The luminance allocation unit 55 may allocate the luminance of the first subpixel 31, the luminance of the second subpixel 32, and the luminance of the third subpixel 33 to the first subpixel 31, the second subpixel 32, and the third subpixel 33 of the two pixels, for example, the adjacent lower pixel and the adjacent right pixel.

Eighth Embodiment

The embodiment relates to a display device 10 where the luminance allocation unit 55 allocates luminance of a pixel at an odd point where a color edge easily occurs to surrounding pixels. The portions common to the first embodiment will not be described.

Herein, the odd point will be described. In the embodiment, the odd point denotes a portion where the color edge easily occurs. As described above, the color edge easily occurs at the time of displaying a high contrast image, for example, a black letter, straight line, dot, or the like on white background. A pixel in a boundary portion where the contrast is greatly different is referred to as an odd point in the description hereinafter. The odd point can be extracted by, for example, an existing edge detection method applying a differential filter to an image.

Figure 26:
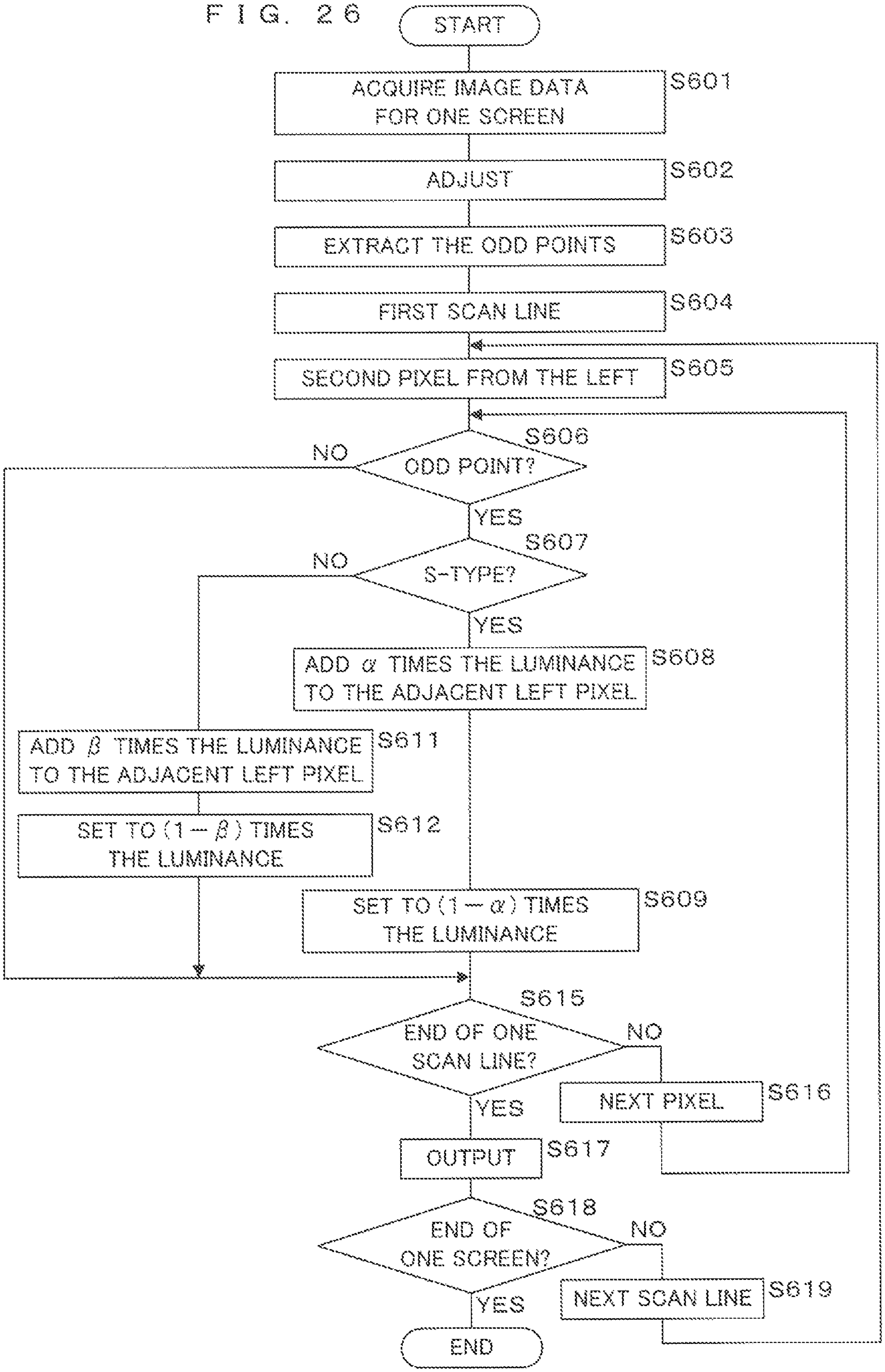
FIG. 26 is a flowchart illustrating a flow of processes of a program according to an eighth embodiment.

FIG. 26 is a flowchart illustrating a flow of processes of a program according to the eighth embodiment. The flow of the processes performed by the control unit 51 according to the embodiment will be described with reference to FIG. 26.

The control unit 51 acquires image data for one screen through the FPC 12 (step S601). The control unit 51 adjusts the image data in accordance with the specification of the display device 10 (step S602). The control unit 51 extracts the odd points of the image data (step S603). The control unit 51 stores the adjusted image data and information representing the location of the odd points in the storage unit 56.

The control unit 51 sets the first scan line among the image data stored in the storage unit 56 as a to-be-processed scan line (step S604).

The luminance allocation unit 55 extracts the data of the second pixel from the left from the storage unit 56 (step S605). The luminance allocation unit 55 determines whether or not the pixel from which the data is extracted is the odd point (step S606). In a case where it is determined that the pixel is the odd point (YES in step S606), the luminance allocation unit 55 determines whether or not the extracted pixel is the S-type pixel 351 (step S607).

In a case where it is determined that the pixel is the S-type pixel 351 (YES in step S607), the luminance allocation unit 55 adds the value of α times the luminance of the first subpixel 31 of the processing pixel to the luminance of the adjacent left pixel (step S608). The luminance allocation unit 55 set to (1−α) times the luminance of the first subpixel 31 of the processing pixel (step S609).

In a case where it is determined that the pixel is not the S-type pixel 351 (NO in step S607), the luminance allocation unit 55 adds the value of β times the luminance of the first subpixel 31 of the processing pixel to the luminance of the adjacent left pixel (step S611). The luminance allocation unit 55 set to (1−β) times the luminance of the first subpixel 31 of the processing pixel (step S612).

After step S612 or step S609 is ended or in a case where the pixel is not the odd point (NO in step S606), the luminance allocation unit 55 determines whether or not the process for one scan line is ended (step S615). In a case where it is determined that the process is not ended (NO in step S615), the luminance allocation unit 55 changes the target pixel to the next pixel, that is, the adjacent right pixel (step S616). The luminance allocation unit 55 returns to step S606.

In a case where it is determined that the process is ended (YES in step S615), the luminance allocation unit 55 outputs the data of the processed scan line to the emission control driver 14, the demultiplexer 15, and the scan driver 16 of the TFT substrate 11 (step S617). The subpixels corresponding to the processed scan lines of the display unit 30 emit light with predetermined luminances. In a case where, as a result of the process of the luminance allocation unit 55, the subpixel of which the luminance exceeds 100% is generated, the subpixel emits light with the luminance of 100%.

The control unit 51 determines whether or not the process for one screen is ended (step S618). In a case where it is determined that the process is not ended (NO in step S618), the control unit 51 changes the to-be-processed scan line to the next scan line (step S619). The control unit 51 returns to step S605.

In a case where it is determined that the process is ended (YES in step S618), the control unit 51 ends the process.

According to the embodiment, it is possible to provide the display device 10 where the luminance allocation unit 55 allocates the luminance of the pixel at the odd points where the color edge easily occurs to the surrounding pixels. Since the luminance allocation unit 55 does not operates with respect to the pixels other than the odd points, the image of, for example, a landscape or the like can be displayed clearly.

A process of sequentially processing data of several scan lines and outputting the data to the display unit 30 and a process of acquiring data of a new scan line through the FPC 12 may be performed in parallel. By doing so, a time difference between the image data acquired through the FPC 12 and the image which is to be displayed on the display unit 30 can be reduced.

Ninth Embodiment

Figure 27:
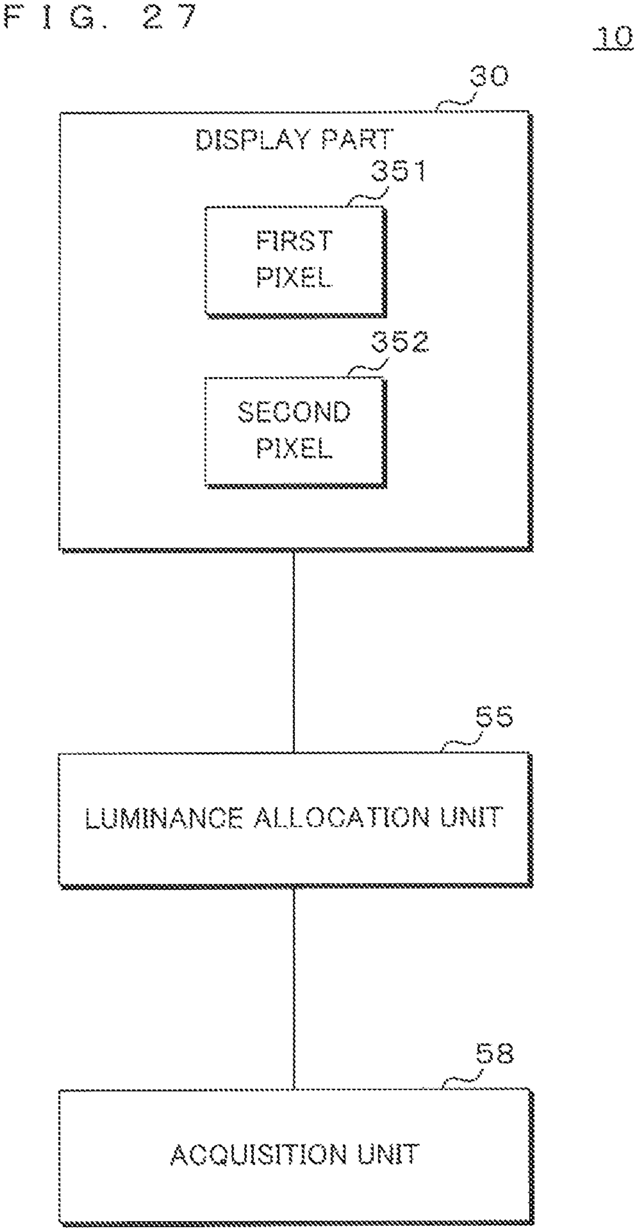
FIG. 27 is a functional block diagram illustrating operations of a display device according to a ninth embodiment.

FIG. 27 is a functional block diagram illustrating operations of a display device 10 according to a ninth embodiment. The display device 10 is operated as follows under the control of the control unit 51. An acquisition unit 58 acquires the image signal through the FPC 12. The luminance allocation unit 55 allocates the luminance of the subpixel of the first pixel 351 indicated by the image signal to the luminance of the subpixel in the adjacent second pixel 352. According to the allocated luminance, the subpixels of the first pixel 351 and the second pixel 352 in the display unit 30 emit light. By doing so, the image represented by the image signal is displayed on the display unit 30 of the display device 10.

Tenth Embodiment

Figure 28:
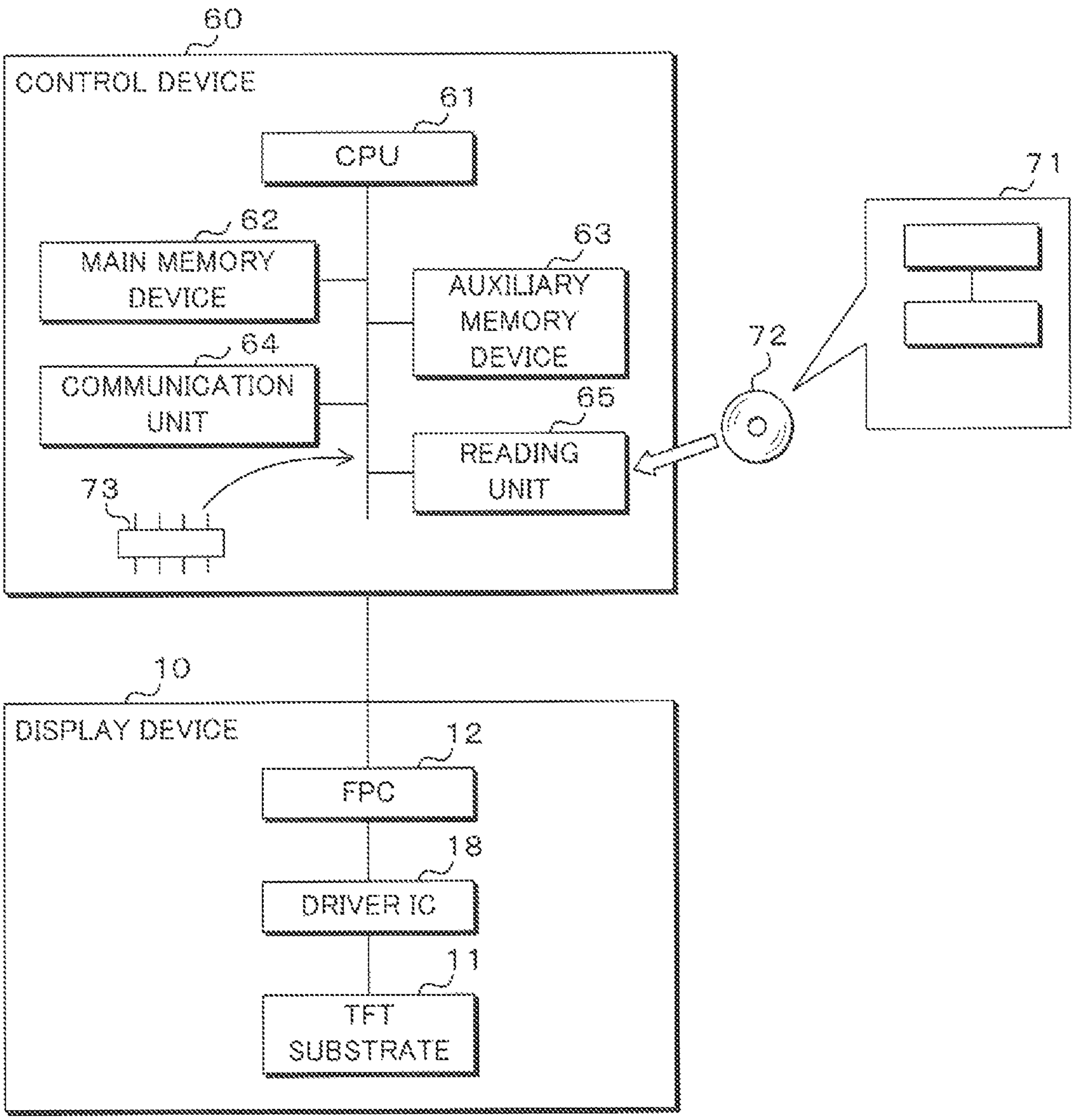
FIG. 28 is a diagram illustrating a configuration of a display device according to a tenth embodiment.

The embodiment relates to an aspect of controlling a display device 10 by combining a general-purpose computer and a program 71 and operating the computer and the program. FIG. 28 is a diagram illustrating a configuration of a display device 10 according to a tenth embodiment. The configuration of the embodiment will be described with reference to FIG. 28. The portions common to the first embodiment will not be described.

The display device 10 according to the embodiment includes an FPC 12, a driver IC 18, and a TFT substrate 11. The control unit 51 in the driver IC 18 according to the embodiment does not include the brightness adjustment unit 52, the color tone adjustment unit 53, the gamma adjustment unit 54, and the luminance allocation unit 55. The driver IC 18 performs a process of converting the image data acquired through the FPC 12 to an analog signal which is to be supplied to the emission control driver 14, the demultiplexer 15, and the scan driver 16 on the TFT substrate 11.

The FPC 12 is connected to a control device 60. The control device 60 is a device controlling overall components of an electronic apparatus in which the display device 10 is incorporated. The control device 60 may be incorporated inside the electronic apparatus or may be installed outside the electronic apparatus. Examples of the electronic apparatus includes a portable electronic apparatus, for example, a mobile phone, a tablet terminal, an information processing terminal having multiple wireless communication functions, or the like. Examples of the electronic apparatus include a stationary electronic apparatus, for example, a television set, a personal computer, or the like.

The control device 60 includes a central processing unit (CPU) 61, a main memory device 62, an auxiliary memory device 63, a communication unit 64, a reading unit 65, and a bus.

The CPU 61 is a control device which executes a program according to the embodiment. As the CPU 61, one CPU, a plurality of CPUs, a multi-core CPU, or the like is used. The CPU 61 is connected to hardware components constituting the control device 60 via the bus.

The main memory device 62 is a storage device such as an SRAM, a DRAM, and a flash memory. The main memory device 62 temporarily stores information necessary during the processes performed by the CPU 61 and a program during the execution of the CPU 61.

The auxiliary memory device 63 is a storage device such as an SRAM or a flash memory. The auxiliary memory device 63 stores a program which is to be executed by the CPU 61 and various types of information necessary for executing the program.

The communication unit 64 is an interface performing communication with a network (not illustrated). The reading unit 65 is a device reading a portable recording medium 72 and, specifically, for example, a micro SD card slot.

The program 71 is recorded in the portable recording medium 72. The CPU 61 reads the program 71 through the reading unit 65 and stores the program in the auxiliary memory device 63. The CPU 61 may read the program 71 stored in a semiconductor memory 73 such as a flash memory equipped in the control device 60. The CPU 61 may download the program 71 from another server computer (not illustrated) which is connected through the communication unit 64 and the network (not illustrated) and stores the program in the auxiliary memory device 63.

The program 71 is installed as a control program for the control device 60 and is loaded on the main memory device 62 to be executed. Therefore, the control device 60 functions as the control unit 51 of the above-described display device 10. Namely, the CPU 61 performs adjustment in accordance with the characteristic of the display device 10 and outputs the image signal after the performing of the above-described process of the luminance allocation. The display device 10 acquires the processed image signal through the FPC 12. The driver IC 18 converts the image signal to an analog signal to output the analog signal to the circuits on the TFT substrate 11.

Eleventh Embodiment

Figure 29:
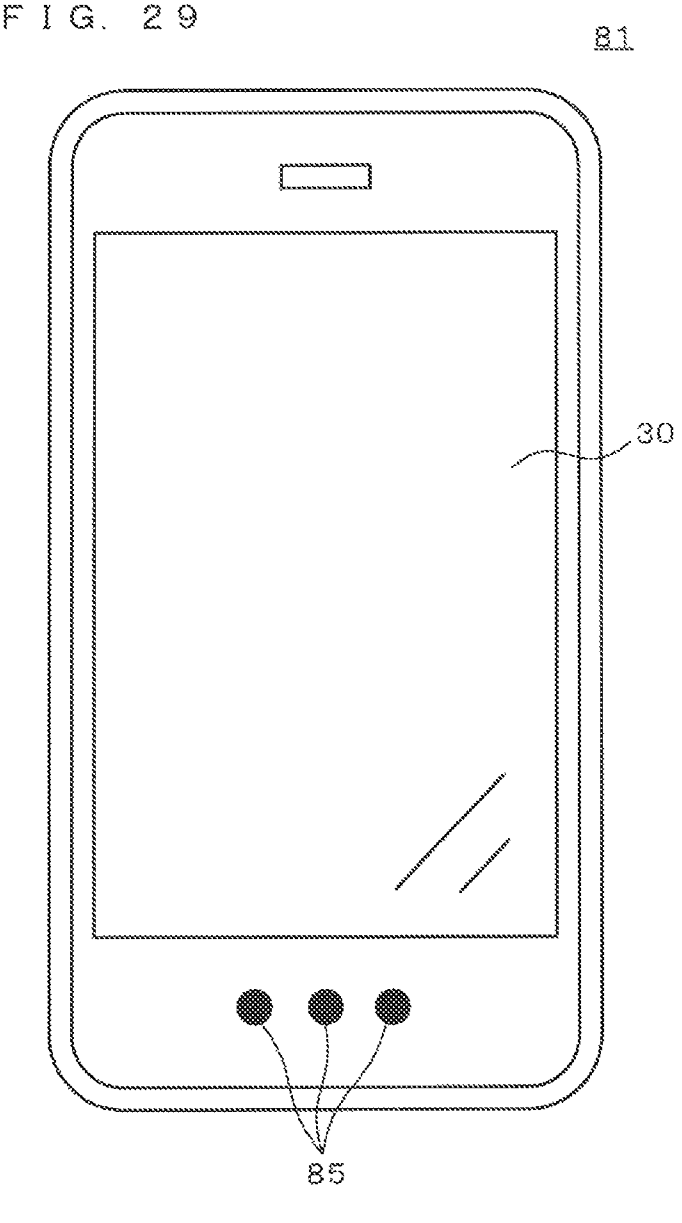
FIG. 29 is a diagram illustrating outer appearance of an electronic device according to an eleventh embodiment.

The embodiment relates to an electronic apparatus in which a display device 10 is incorporated. FIG. 29 is a diagram illustrating outer appearance of an electronic device according to an eleventh embodiment. The configuration of the embodiment will be described with reference to FIG. 29. The portions common to the first embodiment will not be described.

The electronic apparatus according to the embodiment is a smartphone 81. The smartphone 81 has a shape of a rectangular flat plate and includes a display unit 30 on one-side surface. Input buttons 85 are provided in the periphery of the display unit 30. A touch panel which receives scanning by a user is provided to the display unit 30. The smartphone 81 has various information processing functions. For example, the smartphone 81 displays information obtained through a network (not illustrated) connected by wireless communication or wired communication and information processed based on input by the user on the display unit 30.

The smartphone of FIG. 29 is an example of the electronic apparatus in which the display device 10 is incorporated. The display device 10 can be incorporated in an arbitrary electronic apparatus having a function of displaying an image.

Twelfth Embodiment

Figure 30:
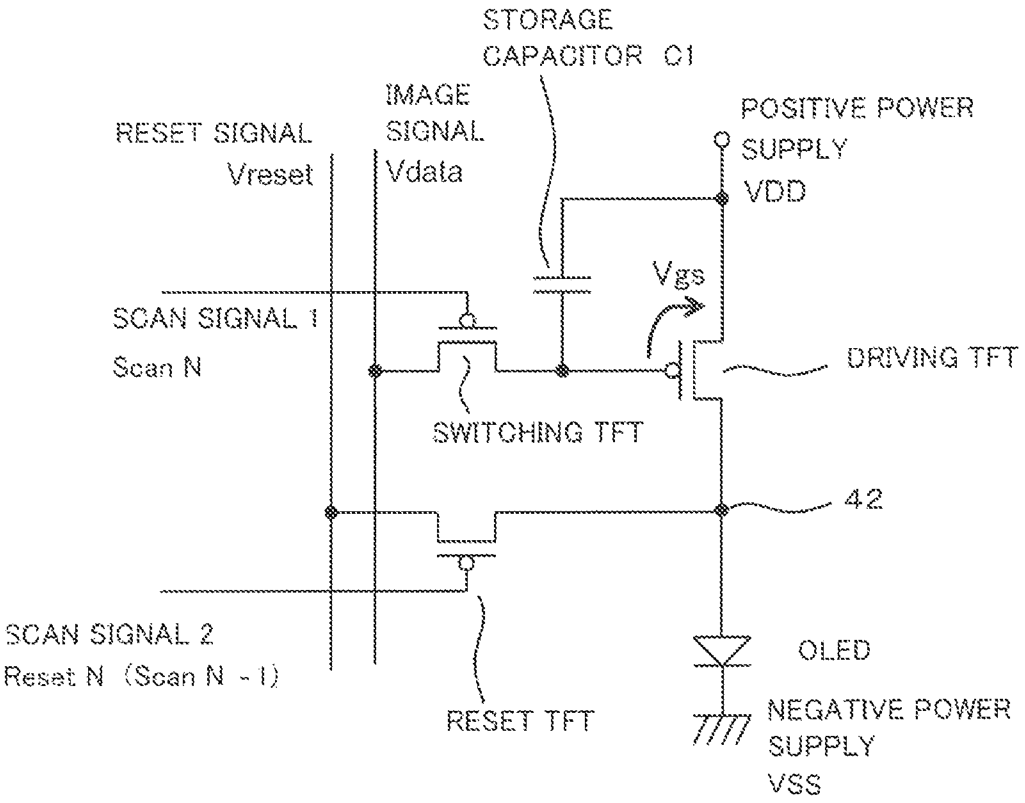
FIG. 30 is a circuit diagram illustrating another pixel circuit allowing one OLED to emit light.
Figure 31:
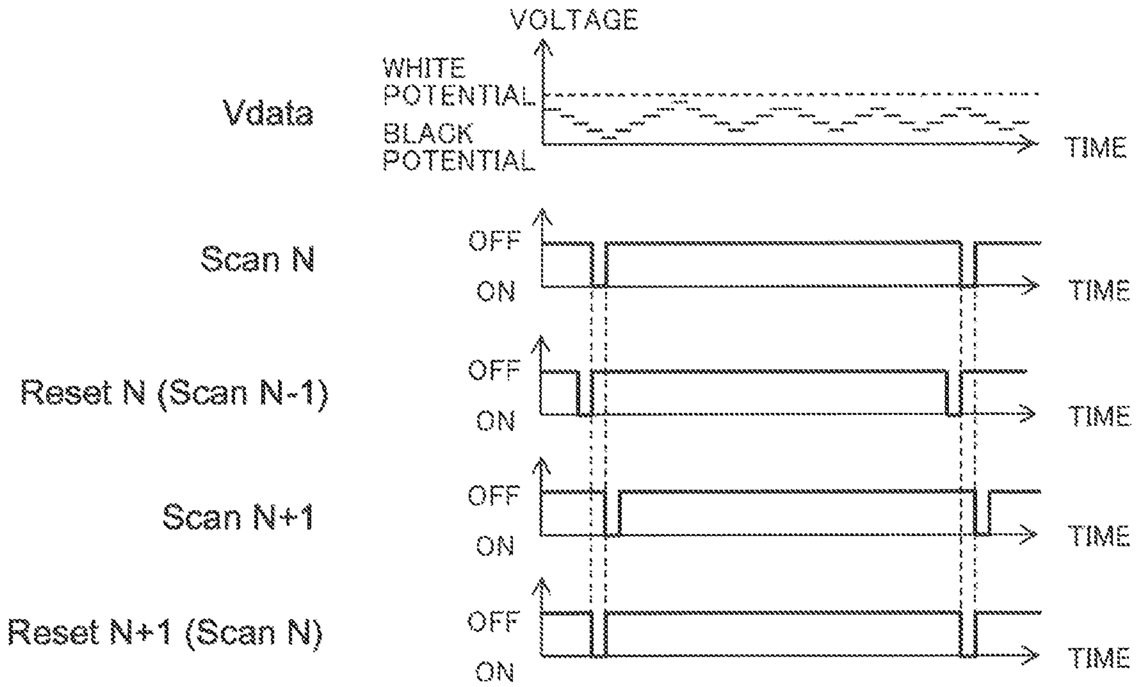
FIG. 31 is a time chart illustrating an image signal and driving signals with respect to the circuit diagram of FIG. 30.
Figure 32:
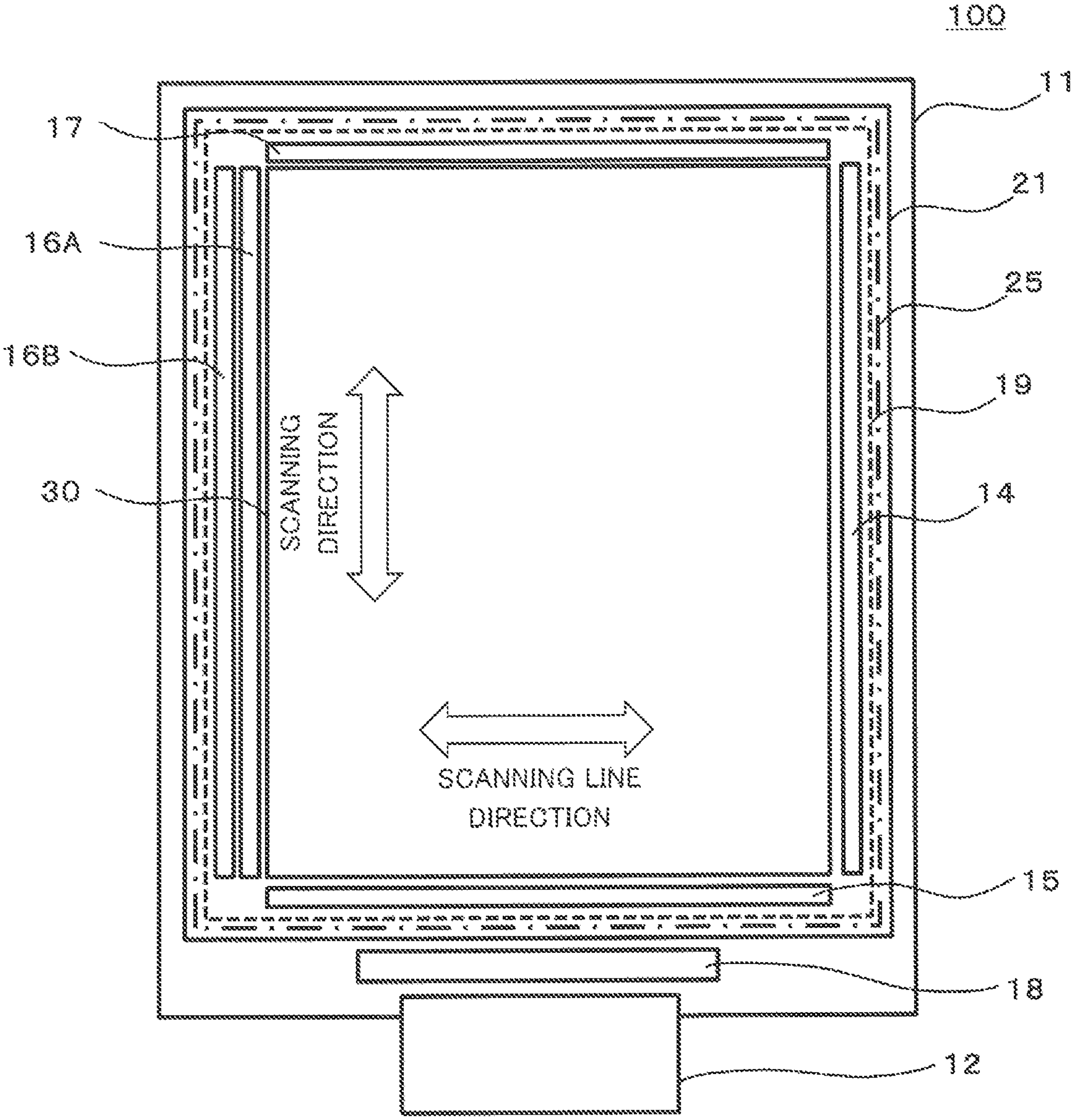
FIG. 32 is a diagram illustrating outer appearance of a display device.

Another example of the pixel circuit allowing the subpixel to emit light which is different from FIG. 12 will be described. FIG. 30 is a circuit diagram illustrating another pixel circuit allowing one OLED to emit light. FIG. 31 is a time chart illustrating an image signal and driving signals with respect to the circuit diagram of FIG. 30. FIG. 32 is a diagram illustrating outer appearance of a display device according to the embodiment.

A display device 100 illustrated in FIG. 32 is different from the display device 10 of FIG. 1 in terms of the following two points. First, as scan drivers, two scan drivers 16A and 16B exist. In addition, there is a difference in terms of arrangement of circuitry (14, 15, 16A, 16B, and 17) and arrangement of a sealing plate 21, a sealing portion 25, and a cathode electrode 19. In addition, internal arrangement of the display device 100 may be appropriately changed.

A positive power supply VDD, a negative power supply VSS, an image signal Vdata, a scan signal ScanN as a scan signal 1, a scan signal ResetN (ScanN−1) as a scan signal 2, and a reset signal Vreset are input to the pixel circuit of FIG. 30. The image signal Vdata is output from a demultiplexer 15. The scan signal ScanN as the scan signal 1 is output from the scan driver 16A. The scan signal ResetN (ScanN−1) as the scan signal 2 is output from the scan driver 16B.

The pixel circuit includes an OLED, a switch TFT, a driving TFT that controls a current flowing to the organic light emitting element, a reset TFT, and a storage capacitor C1. The pixel circuit applies a voltage equal to or less than a voltage of the cathode electrode 19 to the anode electrode 43 before the OLED emits light. The image signal Vdata is input to a source electrode of the switch TFT. The reset signal Vreset is input to a source electrode of the reset TFT.

The scan signal ScanN as the scan signal 1 is input to a gate electrode of the switch TFT. The scan signal ResetN (ScanN−1) as the scan signal 2 is input to a gate electrode of the reset TFT. The positive power supply VDD is connected to a first electrode of the storage capacitor C1 and a source electrode of the driving TFT. The negative power supply VSS is connected to a cathode electrode 19 of the OLED.

A drain electrode of the switch TFT is connected to a second electrode of the storage capacitor C1 and a gate electrode of the driving TFT. A drain electrode of the driving TFT together with a drain electrode of the reset TFT is connected to an anode electrode 43 of the OLED through a TFT circuit output connection portion 42.

Next, the operations of the pixel circuit of FIG. 30 will be described with reference to FIG. 31. The horizontal axes of FIG. 31 denote time. The vertical axes of FIG. 31 denote a voltage of the image signal Vdata, a voltage of the scan signal ScanN as the scan signal 1 of an N-th scan line, a voltage of the scan signal ResetN (ScanN−1) as the scan signal 2 of an N-th reset line, a voltage of the scan signal ScanN+1 as the scan signal 1 of an (N+1)-th scan line, and a voltage of the scan signal ResetN+1 (ScanN) as the scan signal 2 of an (N+1)-th reset line. The image signal Vdata is the voltage between a black potential and a white potential corresponding to the brightness with which each OLED is allowed to emit light. The scan signals ScanN and ScanN+1 as the scan signals 1 and the scan signals ResetN (ScanN−1) and ResetN+1 (ScanN) as the scan signals 2 are any one of ON and OFF. In FIG. 31, the scan signal is ON in the case of a low voltage and OFF in the case of a high voltage.

The pixel circuit according to the embodiment and the pixel circuit of FIG. 12 are different from each other according to presence or absence of a function of the reset TFT of resetting the anode electrode of the OLED. The reset TFT is used for stopping the light emission of the OLED by setting the voltage between the anode electrode and the cathode electrode of the OLED to be not in a forward state (the voltage of the anode electrode is higher than the voltage of the cathode electrode) but in a zero-bias state or a backward state (the voltage of the anode electrode is lower than the voltage of the cathode electrode).

More specifically, as illustrated by the scan signals ResetN (ScanN−1) and ResetN+1 (ScanN) as the scan signals 2 in the timing chart of FIG. 31, the reset TFT is ON immediately before the scan signal ScanN or ScanN+1 as the scan signal 1 is ON. If the reset TFT is ON, the reset signal Vreset is applied to the TFT circuit output connection portion 42. The reset signal Vreset is, for example, a potential equal to of the negative power supply VSS or a potential lower than the potential of the negative power supply VSS. As a result, since the diode is in the backward region, so that the OLED does not emit light.

In this manner, the light emitting of the OLED is stopped by using the reset TFT, so that a black level can be lowered. In addition, frequently-seen crosstalk between subpixels can be improved.

The crosstalk between subpixels occurs due to various causes. For example, in a case where a hole transport layer and a hole injection layer among layers of the OLED are common to the subpixels, a current flow between the subpixels is generated. For this reason, when one subpixel emits light, in some cases, other adjacent subpixels may slightly emit light. If such crosstalk occurs, in some cases, the light emitting becomes a color edge.

For example, the voltage of the TFT circuit output connection portion 42 is set to the reset signal Vreset by the reset TFT, so that the light emitting caused by the current flow between the subpixels can be stopped. Therefore, the crosstalk is improved. Accordingly, the occurrence of the color edge can be reduced.

Thirteenth Embodiment

Still another example of the pixel circuit allowing the subpixel to emit light will be described. The portions common to the twelfth embodiment will not be described.

Figure 33:
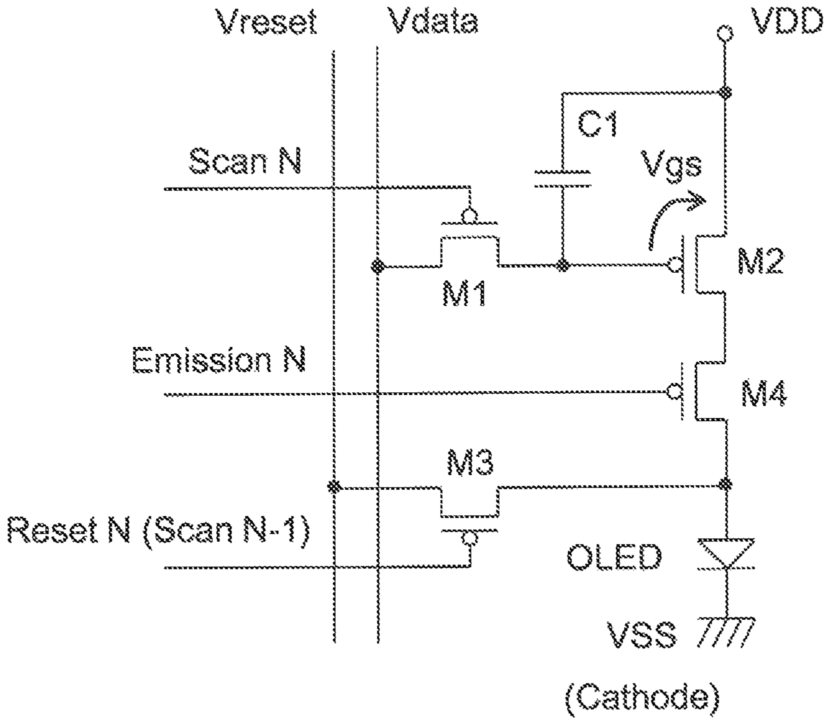
FIG. 33 is a circuit diagram illustrating still another pixel circuit allowing one OLED to emit light.
Figure 34:
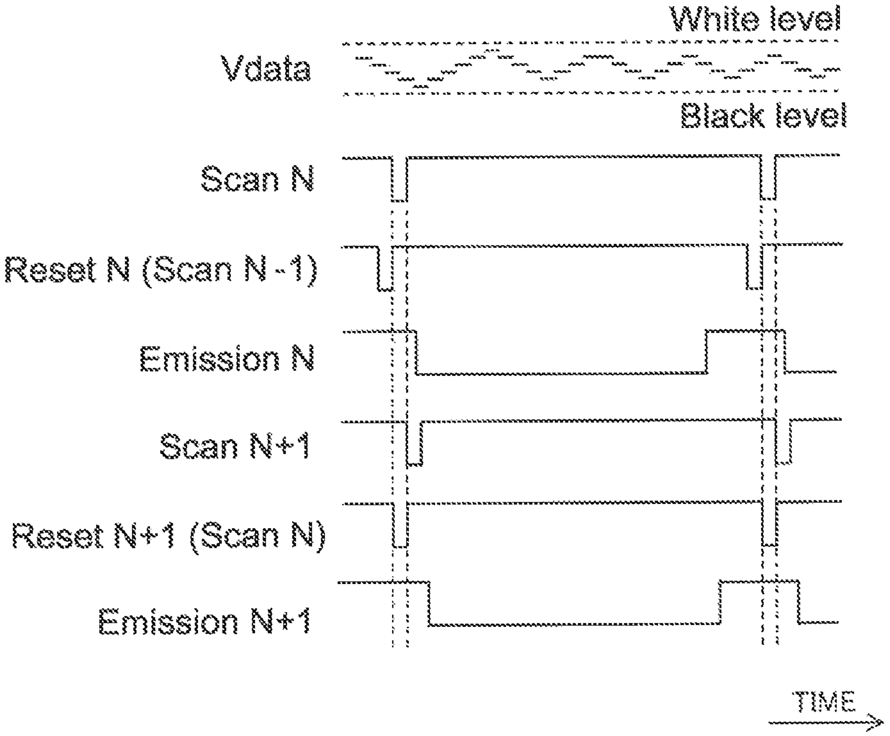
FIG. 34 is a time chart illustrating an image signal and driving signals with respect to the circuit diagram of FIG. 33.

FIG. 33 is a circuit diagram illustrating still another pixel circuit allowing one OLED to emit light. FIG. 34 is a time chart illustrating an image signal and driving signals with respect to the circuit diagram of FIG. 33.

A positive power supply VDD, a negative power supply VSS, an image signal Vdata, a scan signal ScanN as a scan signal 1, a scan signal ResetN (ScanN−1) as a scan signal 2, a reset signal Vreset, and an emission signal EmissionN are input to the pixel circuit of FIG. 33. The emission signal EmissionN is output from an emission control driver 14.

The pixel circuit includes an OLED, a transistor M1 as a switch TFT, a transistor M2 as a driving TFT, a transistor M3 as a reset TFT, a transistor M4 as an emission TFT, and a storage capacitor C1. The image signal Vdata is input to a source electrode of the switch TFT. The reset signal Vreset is input to a source electrode of the reset TFT.

The scan signal ScanN as the scan signal 1 is input to a gate electrode of the switch TFT. The scan signal ResetN (ScanN−1) as the scan signal 2 is input to a gate electrode of the reset TFT. The emission signal EmissionN as the emission signal is input to a gate electrode of the emission TFT. The positive power supply VDD is connected to a first electrode of the storage capacitor C1 and a source electrode of the driving TFT. The negative power supply VSS is connected to a cathode electrode 19 of the OLED.

A drain electrode of the switch TFT is connected to a second electrode of the storage capacitor C1 and a gate electrode of the driving TFT. A source electrode of the emission TFT is connected to a drain electrode of the driving TFT. A drain electrode of the emission TFT together with a drain electrode of the reset TFT is connected to an anode electrode 43 of the OLED through the TFT circuit output connection portion 42.

Next, the operations of the pixel circuit of FIG. 33 will be described with reference to FIG. 34. The horizontal axes of FIG. 34 denote time. The vertical axes of FIG. 34 denote a voltage of the image signal Vdata, a voltage of the scan signal ScanN as the scan signal 1 of an N-th scan line, a voltage of the scan signal ResetN (ScanN−1) as the scan signal 2 of an N-th reset line, a voltage of the emission signal EmissionN as the emission signal of an N-th emission signal line, a voltage of the scan signal ScanN+1 as the scan signal 1 of an (N+1)-th scan line, a voltage of the scan signal ResetN+1 (ScanN) as the scan signal 2 of an (N+1) reset line, and a voltage of the emission signal EmissionN+1 as the emission signal of an (N+1)-th emission signal line. The vertical axes in FIG. 34 are not illustrated. Emission signals EmissionN and EmissionN+1 are any one of ON and OFF.

The pixel circuit according to the embodiment and the pixel circuit described with reference to FIG. 30 are different from each other in that the emission TFT is connected between the driving TFT and the TFT circuit output connection portion 42 and the emission signal EmissionN is connected to the gate electrode of the emission TFT. The emission TFT is used to control light-emitting time of the OLED by controlling a time of connection of the OLED to the driving TFT.

More specifically, as illustrated in the emission signals EmissionN and EmissionN+1 as the emission signals in the timing chart of FIG. 34, the emission TFT is ON after the scan signal ScanN or ScanN+1 as the scan signal 1 is OFF, and the emission TFT is OFF before the scan signal ResetN (ScanN−1) or ResetN+1 (ScanN) as the scan signal 2 is ON. If the emission TFT is ON, the positive power supply VDD is applied to the TFT circuit output connection portion 42 through the driving TFT and the emission TFT. As a result, since the diode is in the forward region, the OLED emits light.

In this manner, the light-emitting time of the OLED is controlled by using the emission TFT, so that blackening the pixels during the screen displaying, so-called black insertion can be achieved.

In addition, technical characteristics (configuration requirements) described in each embodiment may be combined with each other, and new technical characteristics may be formed by combining the same.

It is to be noted that, as used herein and in the appended claims, the singular forms “a”, “an”, and “the” include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display device comprising:

a display unit where a plurality of first pixels each including subpixels of three colors and a plurality of second pixels each including subpixels of three colors arranged differently from the subpixels in one of the first pixels are alternately arrayed in a row direction and a column direction, the subpixels of the three colors including a subpixel of a first color, a subpixel of a second color and a subpixel of a third color;

a thin film transistor (TFT) circuit disposed below each of the subpixels to control the subpixels; and at least one connection part that connects the TFT circuit and one of the subpixels;

wherein in the first pixel and the second pixel adjacent to each other in the column direction, the subpixel of the second color and the subpixel of the third color are arrayed alternately in the column direction, a column where the subpixel of the first color in the first pixel and the subpixel of the first color in the second pixel are arrayed in parallel with a column where the subpixel of the second color and the subpixel of the third color are alternately arrayed, the columns being arrayed alternately in the row direction, the subpixel of the first color in one of the first pixels has a biased arrangement and is positioned toward a side of the subpixel of the second color in an array direction of the subpixel of the second color and the subpixel of the third color that are arrayed alternately, the subpixel of the first color in one of the second pixels has a biased arrangement and is positioned toward a side of the subpixel of the third color in the array direction of the subpixel of the second color and the subpixel of the third color that are arrayed alternately, the subpixel of the first color in one of the first pixels has a rectangle or rounded rectangle shape whose long axis is parallel with the direction in which the subpixel of the second color and the subpixel of the third color are arrayed alternately, the subpixel of the first color in one of the second pixels has the rectangle or rounded rectangle shape whose long axis is parallel with the direction in which the subpixel of the second color and the subpixel of the third color are arrayed alternately, the at least one connection part of the subpixel of the first color in one of the first pixels is one connection part and is biased from a middle of a long axis of the subpixel of the first color toward an end of the long axis when viewed from the row direction, the at least one connection part of the subpixel of the first color in one of the second pixels is one connection part and is biased from a middle of a long axis of the subpixel of the first color toward an end of the long axis when viewed from the row direction, a biased position where the connection part of the subpixel of the first color in the first pixel is disposed with respect to the middle of the long axis of the subpixel of the first color in the first pixel when viewed from the row direction is relatively different from a biased position where the connection part of the subpixel of the first color in the second pixel is disposed with respect to the middle of the long axis of the subpixel of the first color in the second pixel when viewed from the row direction, a position where the connection part is disposed with respect to the subpixel of the second color, a position where the connection part is disposed with respect to the subpixel of the third color and a position where the connection part is disposed with respect to the subpixel of the first color in the first pixel are relatively same as a position where the connection part with respect to the subpixel of the second color, a position where the connection part is disposed with respect to the subpixel of the third color and a position where the connection part is disposed with respect to the subpixel of the first color in the second pixel, and in a pixel array including the first pixel and the second pixel arrayed in the column direction, the connection part of the subpixel of the first color is disposed between a column where the subpixel of the second color and the subpixel of the third color are alternately arrayed and a column where the subpixel of the first color arranged in parallel with the column where the subpixel of the second color and the subpixel of the third color are alternately arrayed.

2. The display device according to claim 1, wherein the subpixel includes an anode electrode, and the at least one connection part is a portion that connects an output of the TFT circuit and the anode electrode.

3. The display device according to claim 2, wherein a position where the at least one connection part is disposed overlaps with the anode electrode in a plan view.

4. The display device according to claim 1, wherein the TFT circuit includes an identical circuit arrangement pattern for the subpixels of the first to third colors.

5. The display device according to claim 1, wherein in one of the first pixels and one of the second pixels that are adjacent to each other in the row direction, a distance between a first connection part of the at least one connection part for the subpixel of the first color in the one of the first pixels and a second connection part of the at least one connection part for the subpixel of the first color in the one of the second pixels are consistent in the display unit independent of the biased arrangements of the subpixels.

6. The display device according to claim 1, wherein a first square not crossing the subpixels encloses a region including the subpixels of three colors included in one of the first pixels and excluding other subpixels, a second square not crossing the subpixels encloses a region including the subpixels of three colors included in one of the second pixels and excluding other subpixels, and the first square and the second square are arranged without overlapping each other.

7. The display device according to claim 1, wherein the OLED layer is disposed above the at least one connection part, and a position where the at least one connection part is disposed overlaps with the OLED layer in a plan view.

8. The display device according to claim 1, wherein the TFT circuit and one of the subpixels are connected by only one of the at least one connection part.

* * * * *